United States Patent
Kumar et al.

(10) Patent No.: US 10,325,390 B2
(45) Date of Patent: Jun. 18, 2019

(54) GEOMETRIC WORK SCHEDULING WITH DYNAMIC AND PROBABILISTIC WORK TRIMMING

(71) Applicant: QUALCOMM Incorporated, San Diego, CA (US)

(72) Inventors: Tushar Kumar, San Francisco, CA (US); Wenhao Jia, Sunnyvale, CA (US); Arun Raman, San Francisco, CA (US); Hui Chao, San Jose, CA (US); Wenjia Ruan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 15/192,051

(22) Filed: Jun. 24, 2016

(65) Prior Publication Data

US 2017/0287185 A1 Oct. 5, 2017

Related U.S. Application Data

(60) Provisional application No. 62/316,235, filed on Mar. 31, 2016.

(51) Int. Cl.
  *G06T 11/60* (2006.01)
  *G06K 9/36* (2006.01)
  (Continued)

(52) U.S. Cl.
  CPC .......... *G06T 11/60* (2013.01); *G06K 9/36* (2013.01); *G06T 3/4038* (2013.01); *G06T 7/33* (2017.01);
  (Continued)

(58) Field of Classification Search
  CPC ..... G06T 11/60; G06T 3/4038; G06T 7/0028; G06T 19/006; G06K 9/36; H04N 5/23222; H04N 5/23238
  (Continued)

(56) References Cited

U.S. PATENT DOCUMENTS 7,133,571 B2 * 11/2006 Cheatle .................. G06K 9/38
  382/282
7,298,923 B2  11/2007 Zhang et al.
  (Continued)

OTHER PUBLICATIONS

Agarwala, A., et al., "Interactive Digital Photomontage," ACM SIGGRAPH '04, SIGGRAPH 2004 Papers, pp. 294-302.
(Continued)

*Primary Examiner* — Jefferey F Harold
*Assistant Examiner* — Omer Khalid
(74) *Attorney, Agent, or Firm* — The Marbury Law Group, PLLC

(57) ABSTRACT

Various embodiments may include methods executed by processors of computing devices for geometry based work execution prioritization. The processor may receive events, such as images. The processor may overlay a boundary shape on the event to identify discard regions of the event lying outside the boundary shape. The processor may identify work regions of the events lying within the working boundary shape. The devices may determine a cancellation likelihood for each of the identified work regions of the events. The processor may assign a trimming weight to each of the identified work regions based on the determined cancellation likelihoods. The processor may then add each of the identified work regions as a work item to an execution work list in an order based on the assigned trimming weights. The work items may be processed in order of trimming weight priority.

26 Claims, 12 Drawing Sheets

(51) Int. Cl.
*G06T 19/00* (2011.01)
*H04N 5/232* (2006.01)
*G06T 3/40* (2006.01)
*G06T 7/33* (2017.01)

(52) U.S. Cl.
CPC ........ *G06T 19/006* (2013.01); *H04N 5/23222* (2013.01); *H04N 5/23238* (2013.01)

(58) Field of Classification Search
USPC .......................... 348/36; 382/181; 345/634
See application file for complete search history.

(56) References Cited

U.S. PATENT DOCUMENTS

| | | | |
|---|---|---|---|
| 7,609,955 B2 | 10/2009 | Motomura et al. | |
| 7,693,304 B2* | 4/2010 | Obrador | G06T 7/0002 |
| | | | 382/112 |
| 7,778,491 B2 | 8/2010 | Steedly et al. | |
| 8,180,178 B2 | 5/2012 | Cheatle et al. | |
| 8,189,916 B2 | 5/2012 | Grosvenor et al. | |
| 8,363,107 B2 | 1/2013 | Inaguma et al. | |
| 8,553,942 B2 | 10/2013 | Lynch et al. | |
| 8,824,735 B2 | 9/2014 | Pham et al. | |
| 9,088,714 B2 | 7/2015 | Doepke et al. | |
| 9,124,867 B2 | 9/2015 | Furumura et al. | |
| 9,152,616 B2* | 10/2015 | Ying | G06F 17/2247 |
| 9,185,284 B2* | 11/2015 | Chao | H04N 5/23216 |
| 9,443,306 B2 | 9/2016 | Downing et al. | |
| 9,626,932 B2* | 4/2017 | Kato | H04N 5/93 |
| 9,715,731 B2 | 7/2017 | Desnoyer et al. | |
| 2008/0005332 A1 | 1/2008 | Pande et al. | |
| 2012/0026165 A1* | 2/2012 | Morifuji | H04N 5/23238 |
| | | | 345/419 |
| 2012/0293607 A1 | 11/2012 | Bhogal et al. | |
| 2012/0293608 A1 | 11/2012 | Doepke et al. | |
| 2013/0038680 A1 | 2/2013 | Mashiah | |
| 2013/0294650 A1 | 11/2013 | Fukumiya et al. | |
| 2013/0329071 A1 | 12/2013 | Doepke et al. | |
| 2014/0267588 A1 | 9/2014 | Arcas et al. | |
| 2016/0357366 A1* | 12/2016 | Migos | G06F 3/0482 |
| 2017/0286426 A1 | 10/2017 | Anderson et al. | |
| 2017/0289445 A1 | 10/2017 | Kumar et al. | |
| 2018/0108144 A1* | 4/2018 | Tsunashima | H04N 5/225 |

OTHER PUBLICATIONS

Agarwala Aseem., et al., "Panoramic Video Textures," ACM Transactions on Graphics (TOG), Jul. 1, 2005, pp. 821-827, Retrieved from the Internet:URL:http://grail.cs.washington.edu/projectsfpanovidtex/panovidtex.pdf.

International Search Report and Written Opinion—PCT/US2017/014709—ISA/EPO—dated May 29, 2017.

Brown M.A., "Multi-image matching using invariant features," Doctoral Dissertation, 2005, 153 pages.

Rothganger F., et al., "3D Object Modeling and Recognition from Photographs and Image Sequences," 2006, 23 pages.

* cited by examiner

GEOMETRIC WORK SCHEDULING WITH DYNAMIC AND PROBABILISTIC WORK TRIMMING

CROSS-REFERENCE TO RELATED APPLICATIONS

This application claims the benefit of priority under 35 U.S.C. § 119(e) of U.S. Provisional Application No. 62/316,235 entitled "Geometric Work Scheduling with Dynamic and Probabilistic Work Trimming" filed Mar. 31, 2016, the entire contents of all of which are hereby incorporated by reference.

BACKGROUND

The use of mobile device cameras to capture images and record video content continues to grow as a greater number of applications make use of or allow users to share multimedia content. There are many applications of image processing and image generation that place significant demands on computer processing resources. Two examples are stitching together image frames while a user pans a cell phone to generate a panoramic image, and virtual reality imaging. Both techniques require the processing of multiple, sometimes numerous, images in order to generate a single image product. Methods of efficiently processing or pre-processing image data (captured or rendered) are desirable to reduce the processing power required to perform rapid image processing and reduce visual lag. This is particularly the case for mobile devices, such as smart phones, which may have limited processing and power resources.

SUMMARY

Various embodiments may include methods, devices for implementing the methods, and non-transitory processor-readable storage media including instructions configured to cause a processor to execute operations of the methods for geometry-based work prioritization on a computing device. Various embodiments may include obtaining a first image, overlaying a default boundary shape on the first image to initialize a working boundary shape and identify a discard region lying outside the working boundary shape. Various embodiments may further include identifying work regions lying within the working boundary shape, determining a cancellation likelihood for each of the identified work regions, determining a trimming weight for each of the identified work regions using the cancellation likelihoods, and adding work items associated with each of the identified work regions to an execution work list in an order based, at least in part, on the determined trimming weights.

Some embodiments may further include obtaining a second image, updating a position of the working boundary shape, overlaying the updated working boundary shape on the second image to identify updates to the discard region lying outside the updated working boundary shape, and determining whether any work items are associated with work regions that overlap the discard region. Such embodiments may further include cancelling a work item in response to determining that the work item overlaps the discard region, and updating the work regions lying within the updated working boundary shape. Such embodiments may further include determining a cancellation likelihood for each of the updated work regions, determining a trimming weight for each of the identified work regions based, at least in part, on the cancellation likelihoods, and adding work items associated with each of the identified work regions to the execution work list in an order based, at least in part, on the determined trimming weights.

In such embodiments, determining the cancellation likelihood for each of the updated work regions may include determining a direction in which a focus of the obtained images is moving, and determining the cancellation likelihood based, at least in part, on the determined direction of motion. In such embodiments, the cancellation likelihoods may be determined such that a likelihood of cancellation for the work regions lying closest to a direction of motion is less than the cancellation likelihood for the work regions lying furthest from the direction of motion.

Some embodiments may include generating a composite image from portions of each obtained image that lie within a final updated working boundary shape. In some embodiments, the composite image may be a panorama. In some embodiments, the composite image may be a virtual reality rendering.

Some embodiments may further include redetermining the cancellation likelihood of each of the work regions based, at least in part, on a comparison of a position of an overlay of the updated working boundary shape on the first image to the position of the overlay of the working boundary shape, determining updated trimming weights for the work regions based, at least in part, on the cancellation likelihoods, and adjusting an order of the work items in the execution work list based, at least in part, on the updated trimming weights determined for the work items in the execution work list.

Some embodiments may further include determining a work score for each work item in the execution work list, and determining a work item to execute on a second processor based on the work score. In such embodiments, the work score may be determined based, at least in part, on one or more of the determined trimming weight of the work item, a size of the work item, a shape of the work item, and commonality of processing elements with other work items. Such embodiments may further include determining a work score for each work item in the execution work list, for every processor of the computing device, such that each work item may have multiple work scores indicating processing suitability with regard to each processing unit. In other such embodiments, determining a work score for each work item in the execution work list may be further based, at least in part, on at least one member selected from the group consisting of a launch overhead for the work item, a battery exhaustion associated with processing the work item, ease of cancelling the work item, and utilization of the processor.

In some embodiments, the cancellation likelihood may be based, at least in part, on a distance of a work region from a center of an image.

In some embodiments, determining the cancellation likelihood for each of the identified work regions may include determining a timeout duration, and determining a likelihood that a subsequent image will not lie within a work region for a period exceeding the timeout duration. In such embodiments, determining, by the processor, the likelihood that a subsequent image will not lie within the work region for a period exceeding the timeout duration may include executing one or more Kalman filters to predict a position of the subsequent image.

In some embodiments, there may be multiple working boundary shapes.

In some embodiments, the first image may be a viewport of a virtual reality view space.

In some embodiments, updating the work regions lying within the updated working boundary shape may include identifying one or more new work regions lying within the updated working boundary shape, and changing boundaries of the work regions to fit within the updated working boundary shape.

Further embodiments may include a communications device having a one or more processors configured with processor-executable instructions to perform operations of the methods summarized above. Further embodiments may include a communications device having means for performing functions of the methods summarized above. Further embodiments may include a non-transitory processor-readable storage medium on which is stored processor-executable instructions configured to cause a processor of a communication device to perform operations of the methods summarized above.

BRIEF DESCRIPTION OF THE DRAWINGS

The accompanying drawings, which are incorporated herein and constitute part of this specification, illustrate exemplary embodiments of the methods and devices. Together with the general description given above and the detailed description given below, the drawings serve to explain features of the methods and devices, and not to limit the disclosed embodiments.

DETAILED DESCRIPTION

Figure 1:
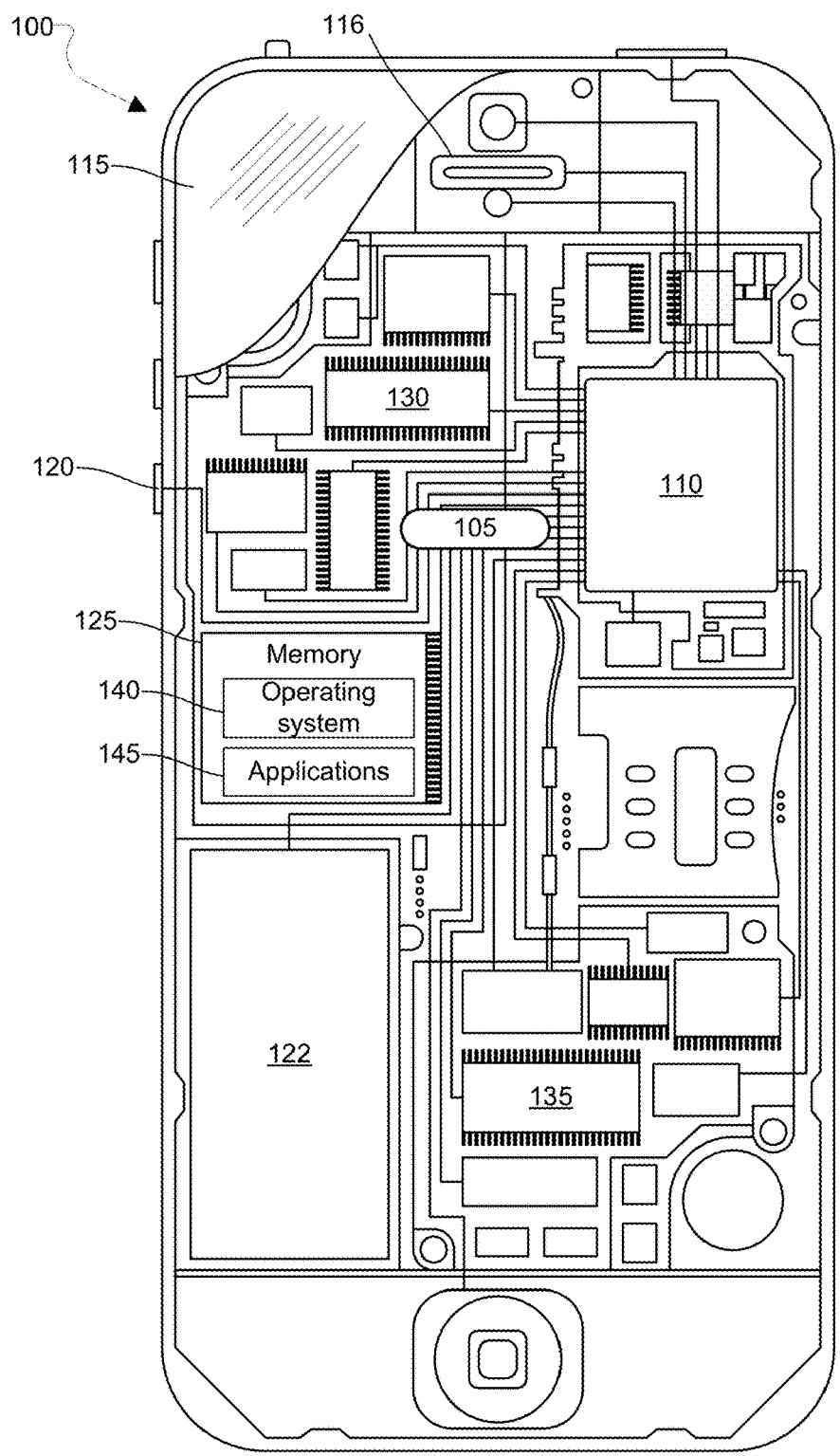
FIG. 1 is a block diagram illustrating a computing device suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

The terms "computing device" is used herein to refer to any one or all of a variety of computers and computing devices, digital cameras, digital video recording devices, non-limiting examples of which include smart devices, wearable smart devices, desktop computers, workstations, servers, cellular telephones, smart phones, wearable computing devices, personal or mobile multi-media players, personal data assistants (PDAs), laptop computers, tablet computers, smart books, palm-top computers, wireless electronic mail receivers, multimedia Internet enabled cellular telephones, wireless gaming controllers, mobile robots, and similar personal electronic devices that include a programmable processor and memory.

The term "geometrically bounded regions" is used herein to refer to any spatial mapping within an N-dimensional space. Geometrically bounded regions may include executable work items mapped to "work regions", unlikely to be executed or redundant work items mapped to "discard regions", and trim weights associated with potentially executable or discardable work items mapped to "trim regions".

The term "panorama" is used herein to refer to any composite image or video that is generated through the combination (e.g., stitching) of multiple image or video files. Image and video files may be captured by a computing device camera, scanning device or other image and video capture device in communication with the computing device. Portions of each image or video may be stitched to other images or videos to produce an extended image having larger dimensions than the original component images. Panoramas may include images or videos having extended axial dimension.

In overview, the various embodiments and implementations may include methods, computing devices implementing such methods, and non-transitory processor-readable media storing processor-executable instructions implementing such methods for geometry based work execution prioritization on a computing device. Various implementations may include detecting, by a processor of the computing device, the occurrence of a key event within an application executing on the computing device. The processor may map the key event to a geometrically-bounded first work region within an N-dimensional space. The processor may then compare the first work region to a default boundary region to initialize a working boundary region and identify one or more discard regions lying within the first work region and outside the default boundary region. The methods may include identifying one or more work regions lying within the working boundary region and may determine a cancellation likelihood for each of the identified work regions of the first work region. The method may further include determining, by the processor, a trimming weight for each of the identified work regions based on the calculated cancellation likelihoods. Various implementations may include submitting, by the processor, each of the identified work regions as a work item that is ready to be executed.

Various implementations may include methods for selecting and/or prioritizing some or all of the currently ready-for-execution work items and starting execution of the selected work-items based on the determined order of priority. The processor may perform the selection and prioritization based on the trimming weights associated with the ready work-items, the available number and types of processors capable of executing the work items (such as, CPU cores and GPUs), and additional properties of the work items themselves (such as the geometric shape of a work item and its location within the default boundary region). As described, various implementations may not immediately execute all the ready work items. The occurrence and subsequent analysis of a future key event may result in the identification of one or more discard regions. These discard regions may overlap in space (i.e., an N-dimensional space into which the work items and discard regions are mapped) with the work space of a ready work item submitted earlier by a processor in response to the detection of a prior key event. If such an overlap is detected, the work item may be discarded without execution. Additionally, in various implementations, the occurrence and analysis of the future key event may result in the processor identifying new work regions (i.e., work items) and corresponding trimming weights. The trim weights of ready-for-execution work items, including those submitted for execution as a result of the occurrence of a prior key event that overlaps with a newly identified work region may be changed to the trim weights associated with the newly identified work region (e.g., work item). Finally, in various implementations the processor may select and prioritize work-items from among all of the currently ready work-items based on their updated trim weights.

Some implementations may include obtaining a first image, such as by captured photo or video, or by receipt of a rendered image. Such implementations may include overlaying a default boundary shape on the first image to initialize a working boundary shape and identify a first discard region of the first image lying outside the working boundary shape. Some implementations may further include identifying work regions of the first image lying within the working boundary shape. Such regions may be rectangular, hyperplanes, three-dimensional, or other geometric shape, and may be oriented in any axial, radial, or spherical orientation. Some embodiments may include calculating or otherwise determining a cancellation likelihood for each of the identified work regions of the first image. The cancellation likelihood may represent either a likelihood that the work region will be discarded and not used in producing the finalized product, or that the work region will be retained and used in the finalized product. Some embodiments may include assigning a trimming weight to each of the identified work regions based on the calculated cancellation likelihoods. The trimming weight may be a number or percentage lying on a pre-determined scale, but may not represent a mathematically accurate chance of work region's retention or cancellation. Some embodiments may include adding each of the identified work regions as a work item to an execution work list in an order based on the assigned trimming weights. These operations may be repeated as subsequent images or videos are obtained, and overlapping regions (e.g. discard regions) may be discarded or removed from the work list. The execution work list may be reordered or reprioritized with every image received and analyzed, and/or each time a processor becomes available to take on a new work tem.

In various implementations, a computing device may implement methods of prioritizing the processing events, video, and images (captured or rendered) based on identified work regions within each image. The computing device may determine the likelihood that identified work regions will be discarded (e.g., trimmed, cancelled or never used) or not discarded (i.e., probability it will appear) in generating a final work product such as a panorama, video segment or application API call. A trimming weight may be assigned to each of the identified work regions to indicate the likelihood that the region will be retained and/or utilized in the generation of the final panorama. Work regions and/or their associated work items may be added to an execution work list individually or in groups, based on the assigned trimming weights. The trimming weights may be reevaluated as new events are detected (e.g., images are captured), and the execution work list may be reordered to account for changes in execution priority of various work regions. Thus, those work regions deemed least likely to be cancelled or discarded may be continuously moved to the front of the execution work list to be processed as soon as processing resources are available. In this manner, the various implementations may enable the pre-processing of substantial portions of application work load such as pre-processing of captured images and processing to stitch those regions together prior to completion of image capture.

The various embodiments and implementations pertain to general methods, devices, and processor-executable instructions stored on non-transitory processor readable media for dividing work of any sort into geometric regions that can be processed according to a probabilistic likelihood of being necessary to a final product or operation. Various embodiments are described generally and with reference to a specific example of image processing and virtual reality applications in order to provide illustrative implementations.

In various embodiments, a computing device may divide the workload of an application across one or more processors. The work may be separated and scheduled in order to increase processing efficiency and reduce power consumption needed in order to generate a final product or perform application operations.

As an example, an application executing on a computing device may capture multiple images intermittently and may stitch the images together to form a panorama image. During active image capture sessions, the computing device may identify work regions of a captured image as images are captured. The computing device may apply one or more geometrically shaped boundaries to an incoming captured image/frame to identify separate regions of the image. For example, the computing device may divide a captured image into rectangular slices with the central portion of the image containing the largest slice and progressively smaller slices closer to the periphery of the image. The computing device may associate work with each of the identified regions and may insert the work into an execution work list (i.e., processing queue) based on the likelihood of each region to be discarded from a final product. The likelihood that a work region will be discarded or cancelled from the final panorama product may be indicated by a trimming weight assigned to the region. The trimming weight assigned to each work region may be updated as new images are captured and compared to the current image.

In various embodiments, the computing device may determine the work regions that are the least likely to be used (i.e., most likely to be discarded) in a final processed image (e.g., a composite panoramic view). In alternative embodiments, the computing device may instead determine the work regions that are the most likely to be retained in the final processed image. The regions may then be assigned to an execution work list (i.e., work processing queue) in an order consistent with the determined likelihood to be retained in the final product. For example, regions near the perimeter of a captured image may be last in the work processing queue, because those regions of the captured image are most likely to be cut out of the final product (e.g., a composite panoramic image) due to vertical drift (up and down) of the camera while the panorama sequence of images is taken.

In various implementations, the computing device may use the work regions (e.g., a default boundary shape) to determine the processing work that should be cancelled. After the work regions (e.g., default boundary shape) are applied to incoming captured images, the computing device may compare some or all of the received images to detect regions that overlap, intersect, are damaged, or otherwise unnecessary. To conserve processing resources, the computing device may cancel or otherwise discard work that is deemed unlikely to be used in a final product, rather than expending processing resources on the processing and rendering of images that will later be cropped out of a final product. The cancelled regions are not processed and as a result will be absent from the final product.

Information regarding movement, drift, speed, direction, etc. is also used to further prioritize processing of work regions based on the likelihood of retention or discard. For example, accelerometer data gathered by the computing device may be used to identify work regions in frames most likely to be rendered in a head-mounted virtual reality display based on head movement. The cancellation of work items associated with discard regions may significantly reduce processing requirements and enable faster pre-processing of essential regions, and as such may reduce the visual effect perceived as jitter. As another example, accelerometer data and/or analysis of frame-to-frame vertical shifts may be used to identify for prioritized processing the work regions within frames most likely to be retained in a panorama due to upward or downward drift as the user pans the camera. Thus, if the camera is panning up, bottom edge slices are deprioritized.

Various implementations may enable the prioritized scheduling of work across multiple processing units of a computing device based on identified processing similarities. The computing device may map processing work of applications to an n-dimensional space, where "n" is a number of application programming interface (API) calls. Regions of the n-dimensional space may have clusters of work identified as having similar processing needs. For example, video editing software applications that need to process similar types of images, or video of the same target may be identified as having similar processing needs. Work associated with the identified regions may be assigned collectively to a processing unit, such as a central processing unit or graphical processing unit. Thus, similar work of different applications may be scheduled for execution as a group to reduce processing redundancy. The assignment of work to different processing units may depend upon the size and complexity of the processing work. For example, a graphical processing unit may be assigned work associated with relatively large processing tasks of high priority, because cancelling or removing tasks from a GPU queue may be resource intensive.

By pre-processing, scheduling, and prioritizing work based on identified regions of similarity or those regions most likely to be used/retained in a final product, the various implementations may reduce the time and processing resources needed to process and stitch images, process sounds, render images (e.g., in virtual reality applications), and the like.

Various implementations may include using work region identification in captured images (e.g., stitching panorama) or frames being rendered (e.g., virtual reality displays). The identified work regions may be tagged or associated with the determined likelihood/probability that the geometric region will be retained in the final product and the scheduling/prioritization of work processing accordingly for captured images and software applications. Thus, the various implementations may prioritize the processing of work regions of captured/rendered images based on likelihood of region retention or discard. Regions may then be scheduled for processing so that regions unlikely to be retained are processed last, and thus may be cancelled before processing begins.

Various implementations may enable the dynamic re-prioritization of image processing of work regions based on active image geometries and/or other data (e.g., accelerometer) that provides information that may be used to determine a likelihood of retention or discard. Work may be cancelled from a processing queue when a geometric region of captured or rendered image is identified as unneeded, thereby leveraging deprioritizing regions unlikely to be retained. To further improve performance, work may be scheduled across processing units based on geometric regions of identified similarity within an n-dimensional space. In this manner, the various implementations may enable pre-processing of the stitching of captured images based on predictions of image regions likely to be retained in the final panorama.

FIG. 1 illustrates a computing device 100 suitable for use with various embodiments. The computing device 100 is shown comprising hardware elements that can be electrically coupled via a bus 105 (or may otherwise be in communication, as appropriate). The hardware elements may include one or more processor(s) 110, including without limitation one or more general-purpose processors and/or one or more special-purpose processors (such as digital signal processing chips, graphics acceleration processors, and/or the like); one or more input devices, which include a touchscreen 115, and further include without limitation one or more cameras, one or more digital video recorders, a mouse, a keyboard, a keypad, a microphone and/or the like; and one or more output devices, which include without limitation an interface 120 (e.g., a universal serial bus (USB)) for coupling to external output devices, a display device, a speaker 116, a printer, and/or the like.

The computing device 100 may further include (and/or be in communication with) one or more non-transitory storage devices such as non-volatile memory 125, which can include, without limitation, local and/or network accessible storage, and/or can include, without limitation, a disk drive, a drive array, an optical storage device, solid-state storage device such as a random access memory (RAM) and/or a read-only memory (ROM), which can be programmable, flash-updateable, and/or the like. Such storage devices may be configured to implement any appropriate data stores, including without limitation, various file systems, database structures, and/or the like.

The computing device 100 may also include a communications subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other devices, and/or any other devices described herein. The computing device (e.g., 100) may further include a volatile memory 135, which may include a RAM or ROM device as described above. The memory 135 may store processor-executable-instructions in the form of an operating system 140 and application software (applications) 145, as well as data supporting the execution of the operating system 140 and applications 145. The computing device 100 may be a mobile computing device or a non-mobile computing device, and may have wireless and/or wired network connections.

The computing device 100 may include a power source 122 coupled to the processor 110, such as a disposable or rechargeable battery. The rechargeable battery may also be coupled to the peripheral device connection port to receive a charging current from a source external to the computing device 100.

The computing device 100 may include various external condition sensors such as an accelerometer, a barometer, a thermometer, and the like. Such external sensors may be used by the computing device 100 to provide information that may be used in the determination as to whether and how obtained images and video are changing from image to image or video to video.

Figure 2:
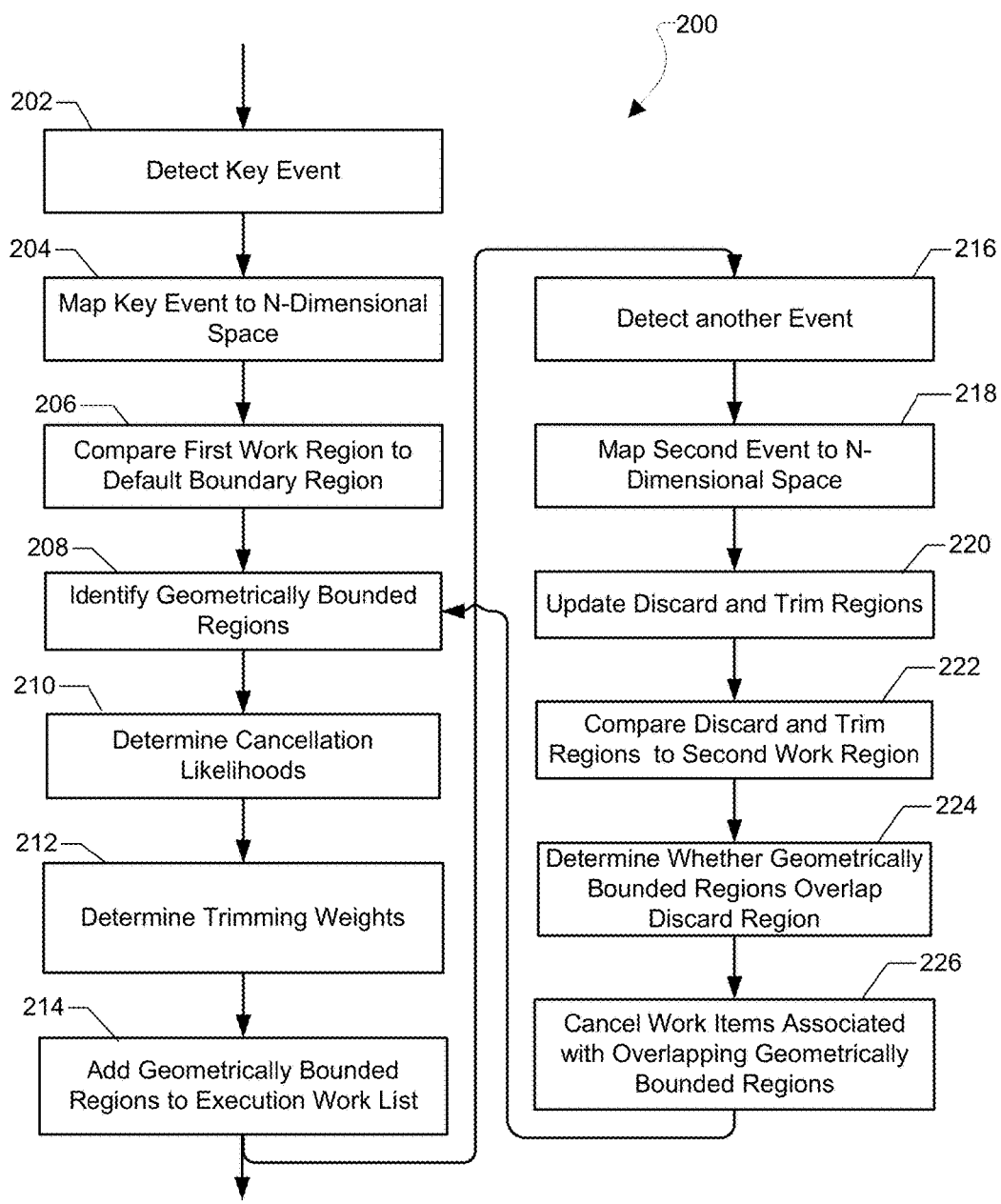
FIG. 2 is a process flow diagram illustrating embodiment methods for geometric work scheduling according to various embodiments.

FIG. 2 illustrates a process flow diagram of a method 200 for geometrically based prioritization of work processing in any application in accordance with various embodiments and implementations. The method 200 may be implemented on a computing device (e.g., 100) and carried out by a processor (e.g., 110) in communication with the communications subsystem (e.g., 130), and the memory (e.g., 125).

In block 202, the computing device may detect a key event, such as an application initialization sequence, a request to run an application, a change in application settings, the receipt of a new key image frame in a panorama stitching application or a change in scenery within a video game. The key event may be detected by the processor of the computing device. The key event may be any application programming interface (API) call. Also, the key event may be a request received by the communications subsystem (e.g., 130) of the computing device or generated by the processor during runtime of a software application such as a virtual reality simulation, video game, or image processing application.

In block 204, the computing device may map the key event to an N-dimensional space. In some implementations, an application programmer may define "N" during software development, such that "N" represents the number of elements needed to define the boundaries of a work region. For example, in a two-dimensional graphics processing application, only vertical and horizontal (x, y) coordinates may be needed to define a work region (e.g., a bounded region of a captured image). In a virtual reality gaming environment, three dimensions may be needed to define the boundaries of a work region, such as vertical, horizontal, and depth or time. Implementations in which the work subjected to geometric scheduling includes API calls may require any number of coordinates in order to define the boundaries of the work, such as processing requirements, size, execution duration, memory allocation, etc. The processor may assess the coordinate "value" of the key event for each element of an N-tuple representing the key event's position within the N-dimensional space. Each key event may have multiple work items associated therewith, and thus may have multiple mappings of geometrically bounded regions associated with work items into the N-dimensional space.

Work regions (such as those used to define the boundaries of a work item, or to identify a region over which to discard any enclosed work items, or to identify a region in which to apply a new trim weight for enclosed work items) may be enclosed areas, volumes, etc. defined by one or more bounds (e.g., a perimeter, a surface, etc.). Example regions may include rectangular, hyperplane, spherical, and the like. Rectangular regions, may generally be defined as $A_1 \le x_1 \le B_1$, $A_2 \le x_2 \le B_2, \ldots A_N \le x_N \le B_N$ where "A" and "B" are boundary constants set by the application programmer. Hyperplane work regions may be defined by multiple inequalities that box in a volume of space. Such regions may be defined by $a_1^{(i)} x_1 + a_2^{(i)} x_2 \ldots + a_N^{(i)} x_N \le b^{(i)}$ where "a" and "b" are constants associated with the i-th inequality. In a further example, a spherical work region may be defined by $a_1^{(i)} x_1^2 + a_2^{(i)} x_2^2 \ldots + a_N^{(i)} x_N^2 \le b^{(i)}$ where "a" and "b" are constants associated with the i-th inequality.

In various implementations, the N-dimensional space, work region boundaries, and work region shapes may all be defined by an application programmer, or randomly selected and refined during execution. A work region may be the spatial volume surrounding and centered at the N-tuple representing an event within the N-dimensional space. A work region area/volume/etc., may be equal or similar across all work regions. Similarly, each work region may have the same geometric shape. Thus, all executable work associated with detected events may be mapped to the N-dimensional space using the determined N-tuple describing the work items of the event, and may have associated work region boundaries of equal or similar shape and distribution from the N-tuple. For example, a three dimensional space may have spherical, rectangular, or polyhedral shaped work regions centered around points represented by the 3-tuple (x, y, t). In some implementations, a programmer may specify different shapes and sizes of work regions based on the type of event detected (i.e., different categories of events may be associated with different shapes and sizes of work region). In other implementations, the characteristics of work regions (i.e., work regions, discard regions, and trim regions may be randomly selected by the computing device end adjusted during execution of the various implementations.

In block 206, the processor of the computing device may compare the boundaries of the first work region (e.g., that of the newly detected event) to the boundary of a default boundary region. The processor may store in memory (e.g., 125) a default boundary region such as a rectangular or spherical boundary region having dimensions generic to the application. Like the shape and size of work regions, the dimensions and boundaries of the default boundary work region may be determined by the application programmer. The processor may compare this default boundary region to the first work region to determine whether any portions of the first work region lay outside of the boundaries of the default boundary region. Any portions of the first work region lying outside the default boundary region may be classified as discard regions. Similarly, the processor (e.g., 110) may determine one or more trim regions as those regions lying within the first work region and the default boundary region, but having a spatial relationship such that work items associated with work regions within the trim regions are likely to be discarded prior to finalization of work processing.

Discard regions may be stored in memory within, linked to or associated with the various work regions that overlap the discard region within a data structure stored in memory (e.g., 125) maintained by a runtime environment of the geometric scheduler (e.g., geometric scheduling runtime environment 522). Work regions overlapping the discard regions may be cancelled from a processing work list (i.e., execution work list), depending on how the working boundary region is updated.

Figure 3:
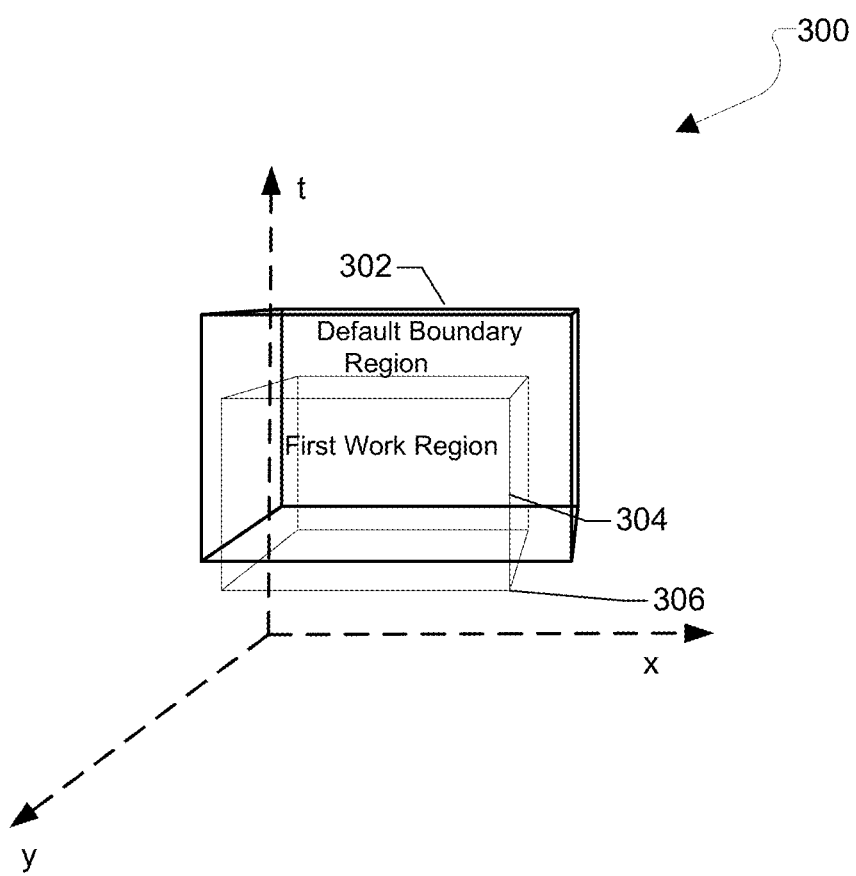
FIG. 3 is a diagram illustrating the mapping of detected events to a three dimensional space according to various embodiments.

In block 208, the processor (e.g., 110) of the computing device (e.g., 100) may identify multiple smaller work regions within the first work region. The smaller work regions may be rectangular, hyperplanes, cubes, or any other shape conducive to division of the work region into subsections or pieces. In various implementations, the smaller work regions may include a center region and multiple outer regions. The center region may occupy the most area or volume, as the center region of each work region is most likely to ultimately be retained in producing the processing of work associated with detected events. The outer regions may extend outward from the center region and may decrease in dimension, or change shape/dimension entirely to suit the geometry of the first work region. An example of image division into multiple work regions is shown in FIG. 3.

In block 210, the processor may determine (e.g., calculate) a cancellation likelihood for each of the identified smaller work regions of the first work region. The cancellation likelihood may be calculated based on one or more of a distance from the center of the first work region or a distance from the center of each smaller work region to the boundary of a discard region. Thus, the cancellation likelihood may be higher for those smaller work regions lying close enough to the discard region or far enough away from the center of the first work region such that the likelihood the associated work will be trimmed is high. In various embodiments, the cancellation likelihood may be determined by other spatial relationships as directed by the application programmer. For example, the characteristics of a specific application may warrant assignment of greater cancelation likelihoods to trim regions lying cattycorner within a work region, or that cancellation likelihoods may be determined based on number of trim regions that overlap between different work regions. The calculation of cancellation likelihoods may be application-specific and may vary from application to application.

In block 212, the processor may determine a trimming weight to each of the identified smaller work regions based on the calculated cancellation likelihood. The cancellation likelihood may be an approximate value and need not represent a precise calculation of the chance of retention or discard. The trimming weight may be an alphanumeric representation of the work region's likelihood to be discarded or retained. For example, the letters A-Z may be used to indicate an order of priority. Similarly, numerical rankings may be assigned to the smaller work regions. Thus, the trimming weights may be generated to indicate both a likelihood of discard or retention, as well as the execution priority of the associated smaller work region.

In block 214, the processor may add or otherwise insert work items associated with each of the work regions into an execution work. Each work region may have multiple work items associated with the region. Work items may be "blocks" of processing work such as chunks of an image, a snippet of an audio file, print job processing, or other task requiring the resources of one or more processors (e.g., 110) of the computing device (e.g., 100). The order of work items within the execution work list may be based on the trimming weights assigned to each work region. That is, each work item may be considered to have the trim weight of the work region to which it belongs. Work items having a higher priority (i.e., those least likely to be discarded, cancelled, or trimmed) may be positioned first within the execution work list. In some implementations, the execution work list may service multiple processors, or may service a single processor. In multiprocessor implementations, each processor may have a separate execution work list associated therewith.

In block 216, the processor may detect the occurrence of or initiation of another (i.e., second or subsequent) event. Second and subsequent events may be detected in a manner similar to that discussed with reference to block 202.

In block 218, the processor may map the second or subsequent event to the N-dimensional space by determining a characteristic N-tuple, and generating an associated work region having a predetermined shape and dimension. The second event may be mapped in a manner similar to that discussed with reference to block 204.

In block 220, the processor may update the discard and trim regions of the various work regions. In this operation, the processor may determine whether any portion of the preexisting discard regions and trim regions are common to both the first work region, any smaller work regions, and the second or subsequent work region. If the second work region is not precisely axially aligned with the first work region within the N-dimensional space, an offset may exist between the boundaries of the respective work regions. The dimensions of any discard regions and trim regions may then be modified according to application-specific update rules. The updated discard and trim regions may be updated every time a new event is detected and the new event's work region is compared to a current instance of the boundaries of the discard and trim regions, or alternatively to the boundaries of all previous work regions. Thus, the updated discard and trim regions may overlap portions of the common shared regions of all mapped work regions at any given time.

In block 222, the processor may compare the updated discard and trim regions to the second image and may classify one half (e.g., the portion associated with the second work region) of any overlapping regions as discard regions.

In block 224, the processor may determine whether any active work items within the execution work list are associated with work regions that overlap discard regions of the second work region. For each new event, the discard regions of the new event may be compared against existing work items in order to delay or remove from processing any work items associated with a work region that is now classified as a discard region. The processor may accomplish this determination by a simple comparison of the work regions of previously detected events to the discard regions of the newly detected event.

In block 226, the processor may cancel any work items associated with work regions that overlap the discard region of the second work region, or subsequent work regions. To cancel the work, the processor (e.g., 110) may simply remove the work item from the work list and any related processing queue.

The processor may again identify work regions in block 208, calculate cancellation likelihoods for each work region in block 210, and assign trimming weights to each work region in block 212.

In block 214, the processor may add the work regions to the execution work list based on both the trimming weights of the first work region and the second work region. Thus, the work items of the second work region may be interspersed into the execution work list and may share priority, have lesser priority, or have higher priority than work items of the first work region. The obtaining and prioritization of geometric based work items may continue until all events are detected and all work items are scheduled.

FIG. 3 illustrates an example of an event mapping 300 in an N-dimensional space. In the illustrated event mapping 300, a computing device (e.g. computing device (e.g., 100))

has mapped a first event to a first work region 304 based on a characteristic triple including a horizontal (e.g., x), vertical (e.g., y), and temporal (e.g., t) coordinate. The first work region 304 has a rectangular shape defined by the light weight line boundaries. A default boundary region 302 is overlaid on the first work region to compare the spatial relationship of their respective boundaries. All portions of the first work region 304 lying within the default boundary region will be included in an initialized working boundary region, which may be compared to subsequent work regions. The portion of the first work region 304 lying below the lower boundary (i.e., the lowest surface/plane) of the default boundary region 302 may be classified as a discard region 306. As new events are detected, new work regions may be mapped to the three-dimensional space and new areas of overlap and exclusion may be determined through subsequent comparisons.

In various implementations, a mathematical center of the first work region may be the N-tuple characterizing the work event. Smaller work regions (not shown) may be defined within the first work region 304 and assigned a trim weight based on a cancellation likelihood. As discussed with reference to FIG. 2, the cancellation likelihood may be a distance from the center of the first work region 304, or from a region of the first work region to the boundary of the discard region 306. Distances may be calculated using known methods, such as p-norms or mahalanobis distance. In some implementations, the various work regions may be analogous to sub-clusters within a larger cluster, and cluster weighting techniques may be applied to calculate cancellation likelihoods.

Illustrative examples of the method 200 include image processing, image stitching for panorama generation, gaming engine operations, three-dimensional voxel processing, machine-vision processing, and virtual reality applications. FIGS. 4-11 disclose the application of method 200 for geometric work scheduling to specific applications for panorama image generation and virtual reality scene management. The scope of the applications of the various embodiments and implementations is not limited to these activities and the examples are provided for illustrative purposes.

Figure 4:
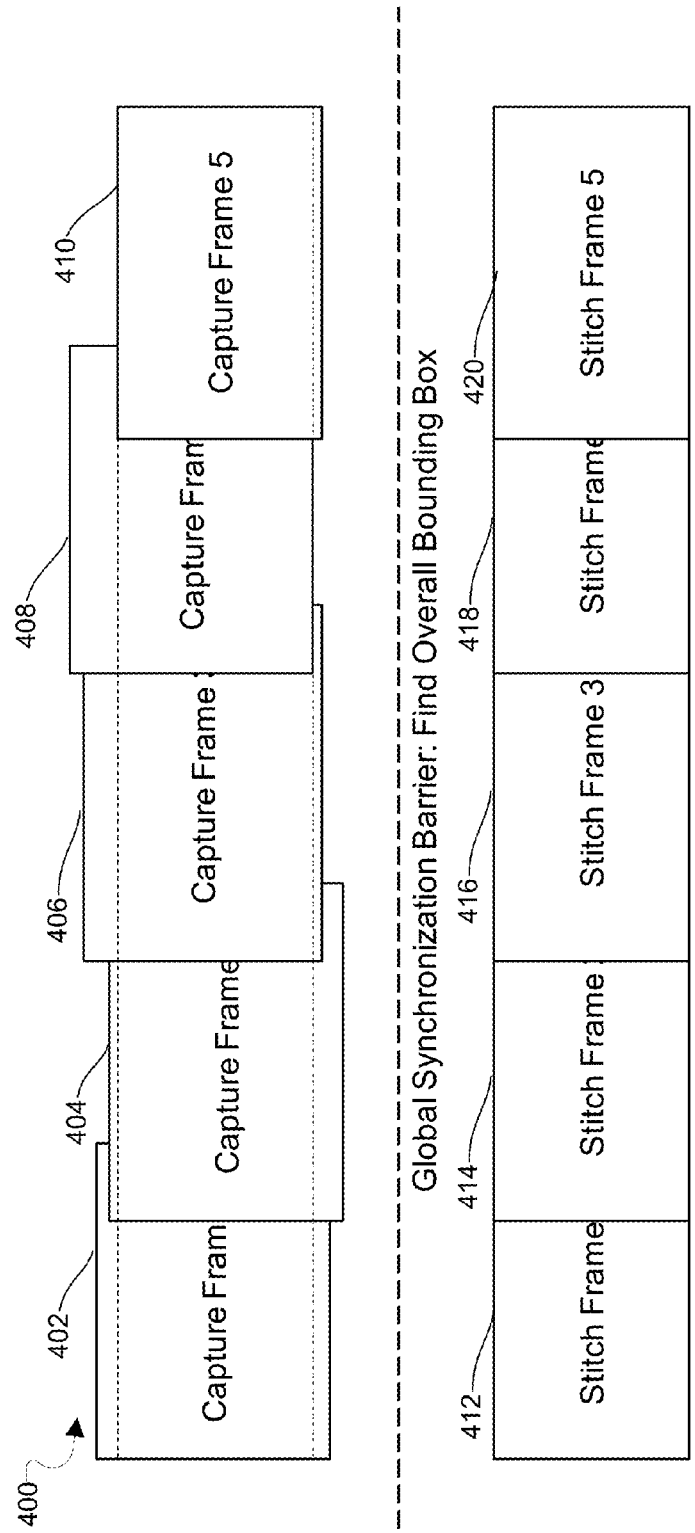
FIG. 4 is a diagram illustrating conventional methods for stitching captured frames to produce a panoramic image.

FIG. 4 illustrates a conventional method of image processing for rendering a panorama. In the illustrated conventional image stitching technique 400, a computing device (e.g. computing device (e.g., 100)) receives multiple image frames 402-410 having vertical or horizontal position shifts of varying degrees. The computing device may wait until all image frames are received before beginning image-processing operations. The computing device (e.g., 100) may align the frames 402-410 in an end to end manner, and then adjust the position of the frames 402-410 until a maximum central area is obtained. In such techniques, the computing device (e.g., 100) may draw a globally synchronized boundary box enclosing the maximum shared vertical distance for all frames 402-410. The computing device (e.g., 100) may trim the excess regions of the frames, e.g., those portions of each frame not lying within the globally synchronized boundary box. Thus, the computing device receives and fully processes each image frame 402-410 before determining the regions to trim as part of creating the finalized panorama from the trimmed frames 412-420. Such techniques significantly delay the start of panorama stitching computations, leading to the inefficient use of available resources where resources are left idling initially until all of the frames arrive, and then the resources are maximally taxed in an attempt to minimize subsequent stitching time, all of which may lead to the occurrence of visual lag.

Figure 5:
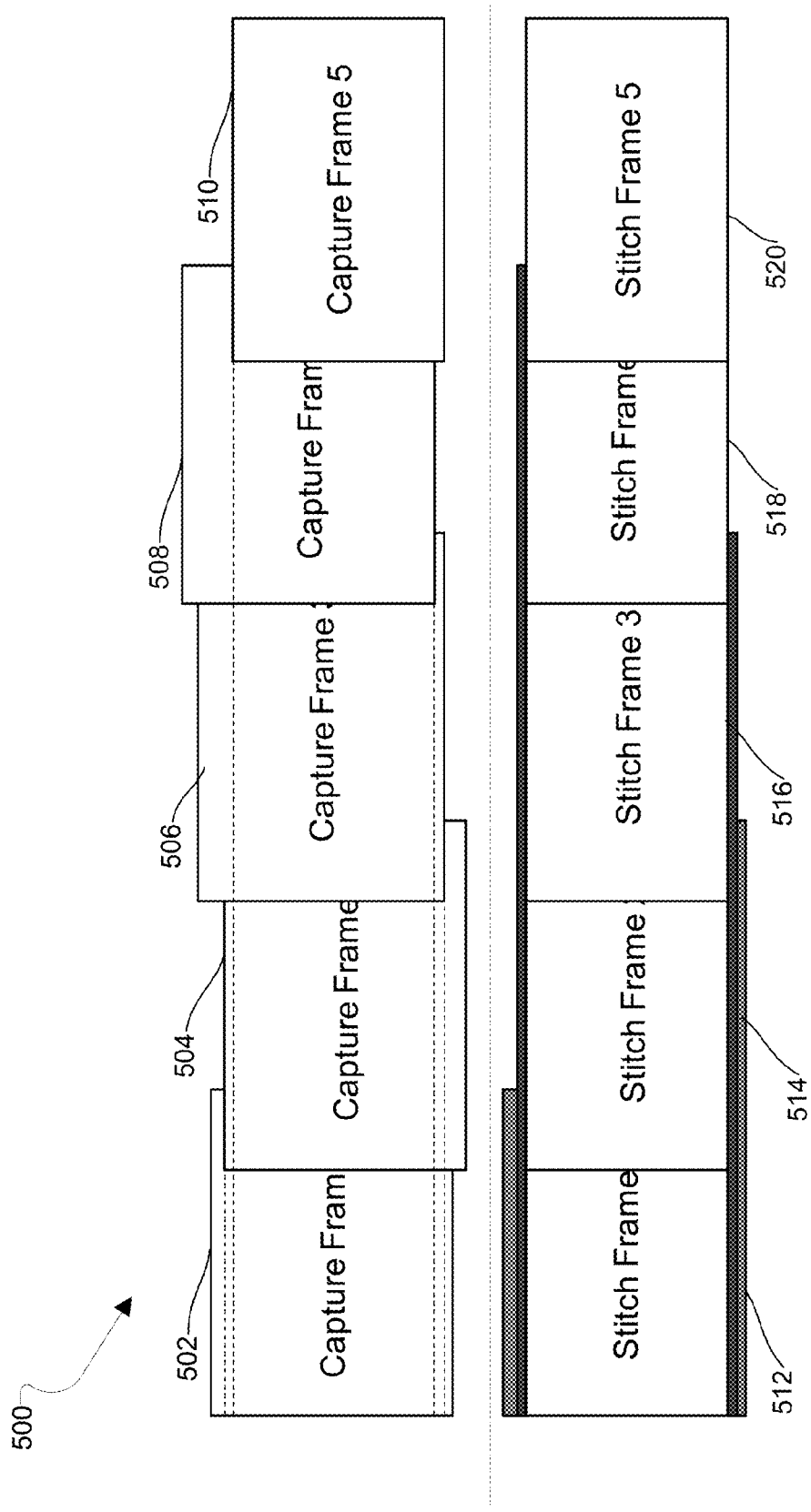
FIG. 5 is a diagram illustrating conventional methods for stitching captured frames to produce a panoramic image.

FIG. 5 illustrates a diagram of another conventional method of image processing. In conventional image stitching technique 500 illustrated in FIG. 5, a computing device (e.g. computing device (e.g., 100)) receives multiple image frames 502-510 having vertical or horizontal position shifts of varying degrees. The computing device may begin cancelling or trimming parts of the image frames 502-510 as the frames are captured. When a new frame is captured, the new frame is compared to the previous frame and overhanging portions removed. For example, in FIG. 5 image frame 512 includes a central common region that is shared by all received frames, and two overhanging regions shown in grey and black. Upon receipt of the second frame, the computing device (e.g., 100) may begin removing the grey region of image frame to produce image frame 512. Similarly, upon receipt of the next image frame, the computing device (e.g., 100) may begin removing the black shaded region from the previous frame to create frame 514 and so on until frames 516-520 are processed and the final image is created. While such techniques do increase processing speed by incorporating pre-processing operations, these techniques do not significantly reduce processing resource consumption because of redundant processing of the regions of image frames that will ultimately be discarded.

Figure 6:
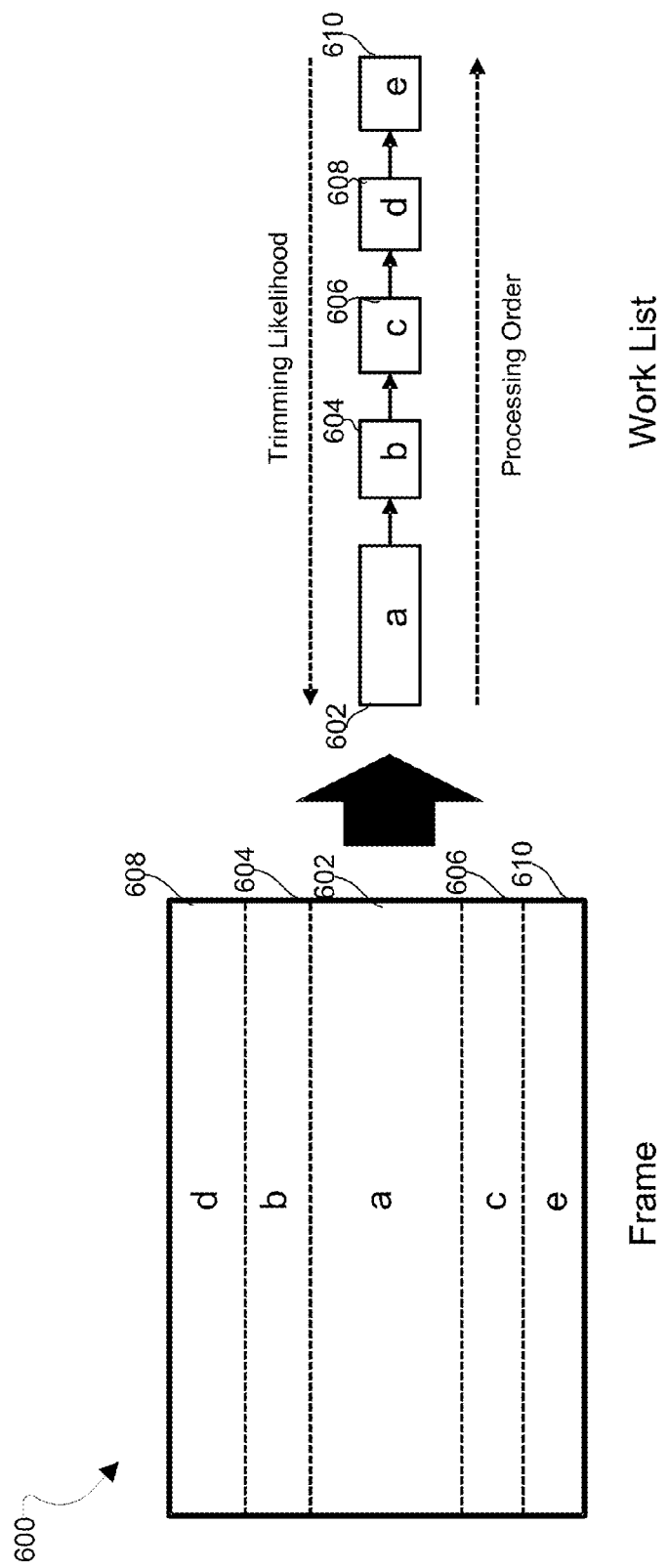
FIG. 6 is a block diagram illustrating an implementation for dividing an image into work regions and inserting each region into a prioritized execution work list on a computing device according to various embodiments.

FIG. 6 illustrates a block diagram of geometric division of an image frame and a resulting execution work list according to various embodiments and implementations. Various implementations may include dividing an obtained image frame into multiple work regions by the processor (e.g., 110) of a computing device (e.g., 100). In various implementations, the image frame 600 may be divided into multiple work regions 602-610. Each work region 602-610 may be assigned a trimming weight representing a cancellation likelihood for the specific work region (e.g., a-e). In various implementations, the processor of the computing device may add or otherwise insert the work regions 602-610 into an execution work list in an order based on their respective trimming weights.

In various implementations, work regions 602-610 may be identified for each newly obtained image frame 600. Work regions may be rectangular by default, but may also include other parallelapoids, hyperplanes, cubes, spheres, circles, polygons, polyhedra, or the like.

Each image frame 600 may be represented an N-tuple ($x_1$, $x_2$, . . . , $x_N$), where N is the number of work regions 602-610. In implementations in which an executing application is an image processing application, the work regions 602-610 may easily be visualized as regions of an image frame 600 delineated by boundary lines. However, in implementations in which the work item for processing is data or API calls, the work region may be an n-dimensional cluster.

In various embodiments, the processor (e.g., 110) of the computing device (e.g., 100) may determine whether any active work items (i.e., work regions waiting to be processed) overlap newly identified work regions 602-610 for the current working image frame 600. Such regions may be represented by various mathematical expressions. For example, rectangular regions may generally be defined as $A_1 \leq x_1 \leq B_1, A_2 \leq x_2 \leq B_2, \ldots A_N \leq x_N \leq B_N$ where "A" and "B" are boundary constants set by the application programmer. Hyperplane work regions may be defined by multiple inequalities that box in a volume of space. Such regions may be defined by $a_1^{(i)}x_1 + a_2^{(i)}x_2 \ldots + a_N^{(i)}x_N \leq b^{(i)}$ where "a" and "b" are constants associated with the i-th inequality. In a further example, a spherical work region may be defined by $a_1^{(i)}x_1^2 + a_2^{(i)}x_2^2 \ldots + a_N^{(i)}x_N^2 \leq b^{(i)}$ where "a" and "b" are constants associated with the i-th inequality.

A processor of a computing device may analyze the work regions 602-610 and calculate a cancellation likelihood for each region. Each cancellation likelihood may be the likelihood that a specific work region 601-610 will be discarded, or alternatively, will be retained for use in generating the final product (e.g., a panorama or virtual reality rendering). The cancellation likelihood of a region R may be represented by the trimming weight L, which may be an alphanumeric indicator of the likelihood that the region R will be discarded to retained for processing of the final product.

The number and relationship of work regions may be tracked in a data structure such as a linked list or space partitioned trees, Bounding Volume Hierarchies (BVH), QuadTrees, OctTrees, or Kd-trees. For example, the work regions 602-610 may be stored contiguously in a top-level tree node based on their mapped position within an N-dimensional space, while the second level tree node contains groupings of work regions 602-610 having a different position within the N-dimensional space. Third level tree nodes may further divide the groupings by direction of motion, distance from the center of the image frame 600, or other positional/dimensional criteria. The use of such a tree data structure may enable log-based look-up times and rapid restructuring of the data stored therein as cancellation (or retention) likelihoods are updated, and regions are discarded. In a further example, if the work region 608 is determined to not overlap any region of the next image frame, then the work region 608 may be discarded. As such, the data related to the region (i.e., region "d") may be removed from the tree and relevant pointers redirected to new nodes.

In some implementations, the work regions 602-610 having trimming weights a-e, may be stored contiguously in a top-level tree node, while the second level tree node contains groupings of work regions 602-610 having similar or equivalent trimming weights, e.g., a may be contained in a first node, b and d may be contained in a second node, and c and e may be contained in a third node. Third level tree nodes may further divide the groupings by direction of motion, distance from the center of the image frame 600, or other criteria.

In various implementations, the processor of the computing device may add the work regions 602-610 of one or more image frames 600 into an execution work list. Such an execution work list may be an iteration space, or other processing queue. In some implementations, the execution work list may be a single processing queue serving multiple processing units (e.g., a CPU, a GPU, and/or a DSP). In other implementations, the execution work list may be a sorting queue that prioritizes work items and passes the items to a processing unit as the work item reaches the top of the execution heap. In some implementations, the execution work list may be implemented as a priority heap in which items of highest priority are removed for execution first. In various implementations, the prioritization may be performed in decreasing order of trim likelihoods, that is, items with the lowest trim likelihood may be removed for execution first. Some implementations may factor in additional aspects into the prioritization, such as the geometric shape of the work-item.

As shown in FIG. 6, work items associated with the work regions 602-610 may be added or inserted into the execution work list in such a manner that the work items having the least likelihood to be cancelled (i.e., most likely to be used) will be pulled off the heap for execution first. Conversely, work items associated with a high likelihood of cancellation may be positioned near the end of the execution work list, thereby delaying the processing of these items. Delaying the processing of work items likely to be cancelled by placing them at the bottom of the work list increases the likelihood that the work items will be discarded before being processes, thereby avoiding processing that turns out to be unnecessary. In various implementations, one or more processors (e.g., 110) may begin executing work items while image frames are still being captured, video is still being recorded, or API calls are still being made. Thus, various implementations may speculatively execute work to maximize upfront concurrency and break decision dependences, while using application-specific knowledge to minimize wasted work.

Figure 7:
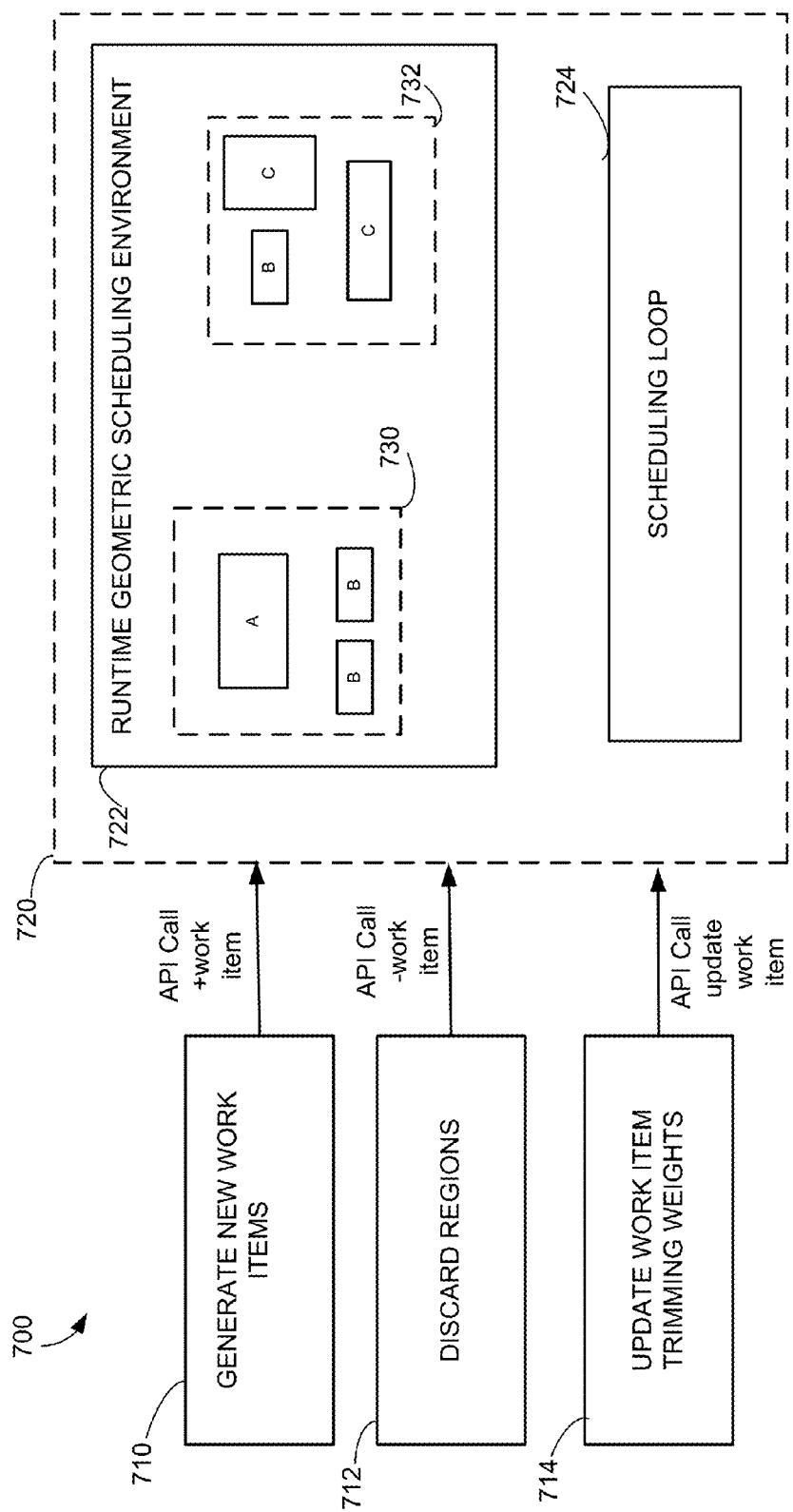
FIG. 7 is a block diagram illustrating an overview of work flow in a geometrically based work prioritization method implemented on a computing device according to various embodiments.

FIG. 7 illustrates a block diagram of work flow through a runtime environment of a geometrically based work prioritization process according to various implementations. The geometric work scheduling scheme 700 is shown having both a general environment 720 and application-specific operations 710, 712, 714. Various embodiments may include receiving or otherwise obtaining at a computing device (e.g., 100), an image frame, a video segment, a set of application API calls, or other processing work to be executed via one or more processors (e.g., 110).

In various implementations, the general environment 720 may control and maintain non-application specific-operations and may maintain data structures tracking information about identified work regions (e.g. work regions 402-410). The general environment 720 may, for example, include a runtime geometric scheduling environment 722 that maintains data structures tracking identified work regions, as discussed with reference to FIG. 4. Each of dotted line boxes 730 and 732 provide a visual representation of an obtained image frame, video segment, application call group, or other processing work set. Each dotted line box 730 732 may contain several component work regions and their associated trimming weights. Various implementations may store this information in space partitioned trees or like data structures. The geometric scheduling runtime environment may maintain and update these data structures as trimming weights are modified and work items are completed or discarded. In various implementations, the general environment 720 may also manage the scheduling loop 724, which schedules individual work items for execution by one or more processors (e.g., 110).

In block 710, a processor (e.g., 110) of the computing device (e.g., 100) may generate new work items. As discussed with reference to FIGS. 4 and 6, the processor (e.g., 110) may generate new work items by obtaining an image, video, group of API calls, or other processing work set; applying a boundary shape (e.g., a bounding box) to the obtained item, identify work regions falling within the boundary shape; determining a cancellation likelihood for each work region; and assigning a trimming weight to each work region based on the cancellation likelihood. The resultant work regions with assigned trimming weights may be construed as work items. Each work item may further include the following information: the center of the work item within the N-dimensional space (i.e., the center of the associated work region); the dimensions of the work item (i.e., the dimensions of the associated work region). The work item may optionally include information regarding a performance multiplier associated with execution of the work item on a specific processing unit (e.g., the GPU), and a power multiplier indicating an increased power efficiency based on execution on a specific processing unit. Further, the work item may include an application specific call-back function (e.g., discard operation) instructing the general environment 720 what to do in the event that a discard request is made for the work item.

At any time during runtime of a parent software application, the processor (e.g., 110) of the computing device (e.g., 100) may generate new work items 710 and may make an API call such as a +work call to the general environment. The geometric scheduling runtime environment may receive the new work item and may store it in association with other work items belonging to the parent image, video segment, API call group, or other processing work set. In various implementations, the geometric scheduling runtime environment may further maintain and track information regarding common elements across different images, video segments, API call groups, or other processing work sets, in order to form processing groups that may be sent to different processing units for efficient execution of like work items.

At any time during runtime of the parent software application, the processor (e.g., 110) of the computing device (e.g., 100), may discard work items that overlap one or more discard regions 712. As discussed with reference to FIG. 7, the processor (e.g., 110) of the computing device (e.g., 100) may discard, cancel, or trim regions of the image, video, API call group, etc., that are deemed unnecessary for the production of a final product. The computing device may discard any work region (e.g., the overhanging work regions in 402-410) that no longer overlaps a received image frame.

Discarding work items associated with unnecessary work regions may be done manually or automatically. Implementations utilizing manual discard will include discard functionality that is executed on the application side or is otherwise managed by user code. In such implementations, after a discard call is made by a parent software application to the general environment 720, the returned response may include the current status of the work item (e.g., unexecuted, executing, done). An application "call-back" function, which may be packaged with the work item upon generation of the work item, may be executed to "undo" any work that is already completed. For example, portions of images that are already done processing, may be discarded and their pixels deleted from the computing device memory. In this manner, software applications may dictate the way that discarded work items should be handled. This approach may enable application developers to make decisions about how to best utilize processing resources based on their knowledge of the software application's processing and power consumption needs. For example, a particular application may include a manual discard operation that instructs the processor (e.g., 110) to cancel the work item, only if it is unexecuted, and to an already executing or completed work item remain as is. Conversely, other software applications may instruct the computing device to cease any executing work immediately in order to conserve much needed processing resources, and delete any completed discard work items from memory immediately.

In various implementations, automatic discard may be implemented when the knowledge of the executing software application is known to the general environment 720. For example, image and video processing applications may be well suited to automatic discard of redundant work regions because the processor (e.g., 110) of the computing device (e.g., 100) can easily identify the type and contents of the processing work (i.e., images or video). Further, the processor (e.g., 110) of the computing device (e.g., 100) may quickly determine whether there is regional overlap across images or video segments. Implementations discussed with reference to FIG. 7 include but are not limited to automatic discard functionality.

In block 714, the processor (e.g., 110) of the computing device (e.g., 100) may update the trimming weights associated with active work items. When new work items are generated, the dimension and position of a working boundary shape (e.g., bounding box) defining the common dimensions shared by related images, video segments, API call groups, etc. may be adjusted. As such, portions of an image or video segment that previously lay within the working boundary shape may no longer lie within the working boundary shape. Conversely, regions of an image or video that were previously denoted as discard regions, may now lie within the perimeter of the working boundary shape. In another example, a work region that was previously positioned along an outer edge of the working boundary box may now lie within the center of the working boundary box thereby decreasing the likelihood that the work region will be discarded. In various implementations, the reevaluation of cancellation likelihood may occur on the software application side, and an associated API call may be made to the general environment 720 to update the data within the space partitioned tree/data structure.

In various implementations, the processor (e.g., 110) of the computing device (e.g., 100) may implement a scheduling loop 724 to execute processing of work items. The processor may reference an execution heap managed by the runtime geometric scheduling environment 722 and pull the "least likely to be cancelled" work item off the heap, e.g., the processor may select the first work item in the execution work list. As is discussed with reference to FIG. 7, the processor (e.g., 110) may execute a single work item on the managing processor, or may pull one or more work items off the heap for execution across multiple processing units (e.g., a CPU, a GPU, and a DSP). In implementations utilizing cross processor execution, the determination as to work queuing for each processing unit may be based on a work score for each work item. The work score may indicate the suitability of each work item to execution by a specific processing unit. Once a work item is completed, its status may be updated within the data structures maintained by the runtime geometric scheduling environment 722 to indicate that the work item processing is complete.

Figure 8:
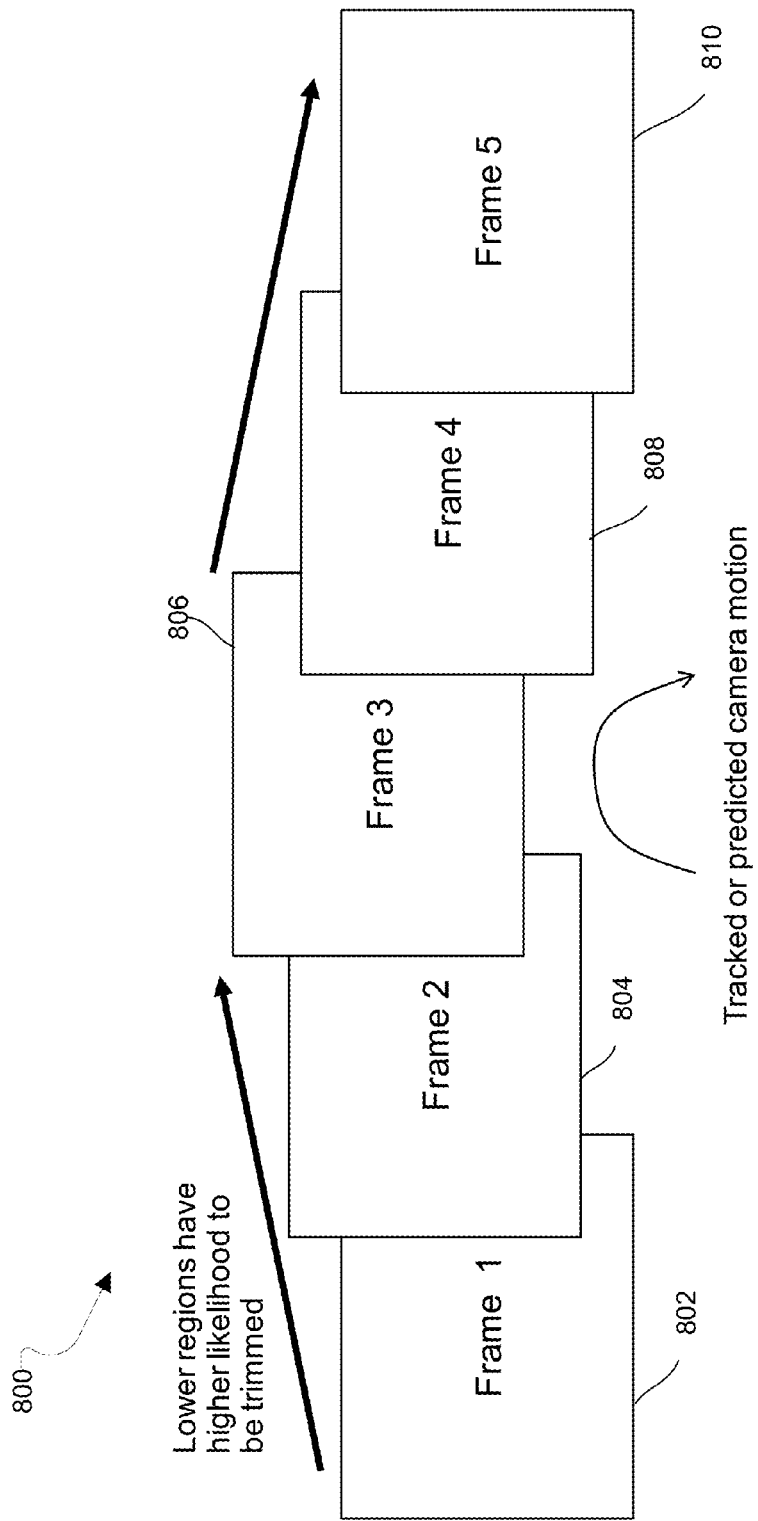
FIG. 8 is a block diagram illustrating motion tracking for determining a likelihood of geometrically-based region discard or retention according to various embodiments.

FIG. 8 illustrates a block diagram of motion tracking 800 of captured image frames according to various embodiments and implementations. Various implementations may include tracking the direction of motion of obtained image frames by the processor (e.g., 110) of a computing device (e.g., 100). In various implementations, the computing device may have an accelerometer or other sensor configured to sense a change in position. As the image capture device (e.g., camera) moves, the elements illustrated within obtained image frames 802-810 may shift with reference to each other. For example, when a user takes pictures with a camera and moving the camera in a parabolic trajectory, the captured image frames may be aligned as illustrated in FIG. 8.

In various implementations, as each new image frame 802-810 is captured, a working boundary shape (e.g., bounding box) defining the common shared dimensions of the image frames is modified (i.e., updated). As the camera moves in an upward direction, the perimeter of the working boundary shape will also move upward, cutting out regions positioned below the lower edge of the highest image (e.g., image frame 806). Thus, the cancellation likelihood of work regions positioned below the lower edge of the highest image frame may previously have been included within the perimeter of the working boundary shape, but may now lie outside the perimeter, and thus may be reclassified as discard regions. Similarly, as image frames 808 and 810 are obtained and analyzed, the upper boundary of the working boundary shape may be lowered to the upper edge of the lowest image frame (e.g., image frame 810).

Figure 9:
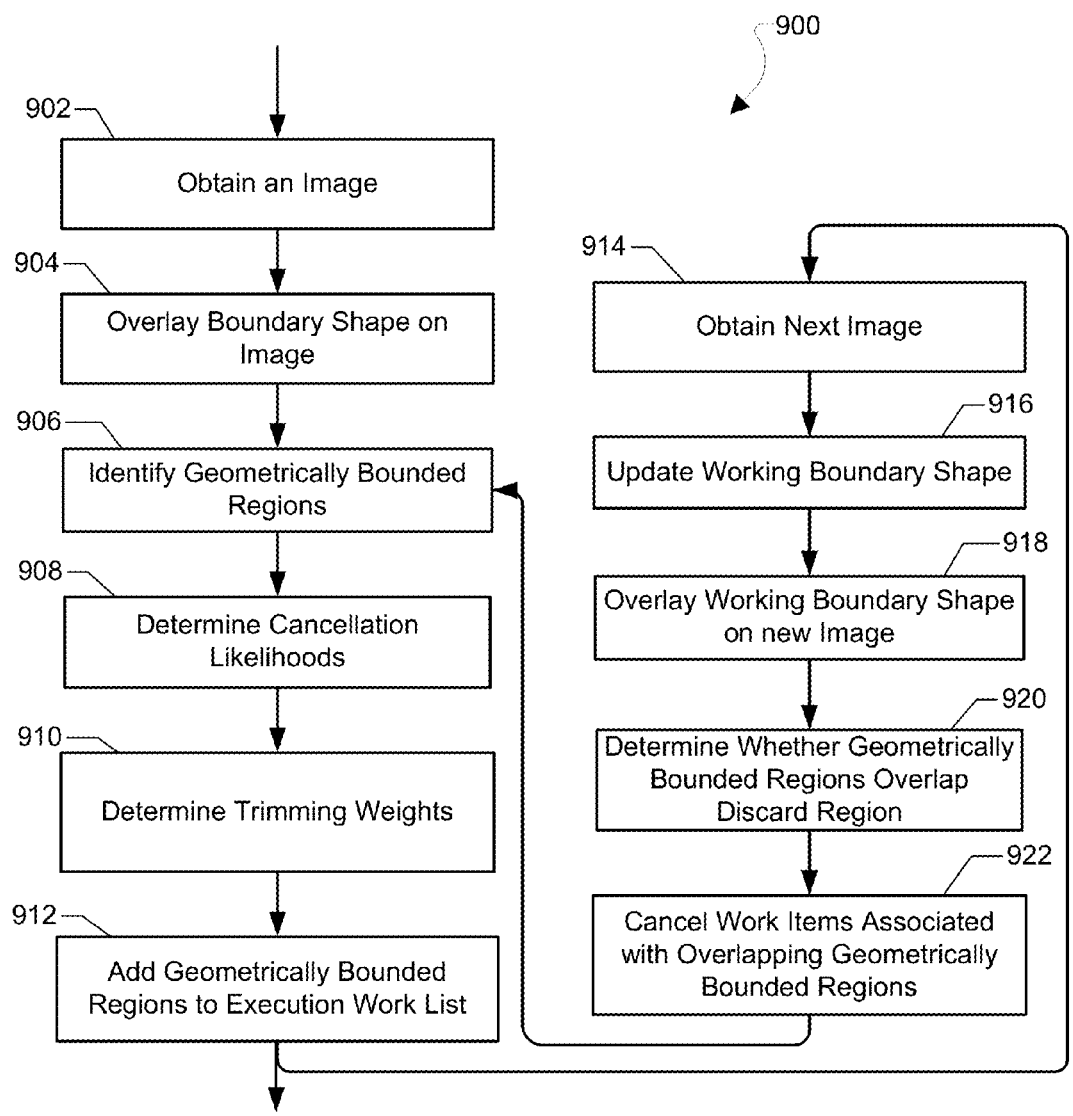
FIG. 9 is a process flow diagram illustrating a method for geometrically based prioritization of work processing in an image processing application according to various embodiments.

FIG. 9 illustrates a process flow diagram of a method 900 for geometrically based prioritization of work processing in an image processing application in various embodiments and implementations. The method 900 may be implemented on a computing device (e.g., 100) and carried out by a processor (e.g., 110) in communication with the communications subsystem (e.g., 130), and the memory (e.g., 125).

In block 902, the computing device may obtain a first image. The first image may be obtained via a camera in communication with the processor of the computing device. The first image may further be a rendered image and may be obtained by the communications subsystem (e.g., 130) of the computing device or generated by the processor during runtime of a software application such as a virtual reality simulation.

In block 904, the processor of the computing device may overlay a boundary shape on the first image. The processor may store in memory (e.g., 125) a default boundary shape such as a rectangular box boundary having dimensions generic to panorama images. The processor may overlay this default boundary shape on the obtained first image to determine whether any portions of the first image lay outside of the perimeter of the default boundary shape. Any portions of the first image lying outside the default boundary shape may be classified as discard regions. Discard regions may be stored in relation to the image frame within a data structure stored in memory (e.g., 125) maintained by a runtime environment of the geometric scheduler (e.g., runtime geometric scheduling environment). Discard regions may later be cancelled from processing, depending on how the boundary shape is updated, as discussed with reference to FIGS. 5 and 6.

In block 906, the processor (e.g., 110) of the computing device (e.g., 100) may identify multiple work regions within the default boundary box. The work regions may be rectangular, hyperplanes, cubes, or any other shape conducive to division of the image into pieces. In various implementations, the work regions may include a center region and multiple outer regions. The center region may occupy the most area or volume, as the center region of each image is most likely to be retained in producing the final panorama image. The outer regions may extend outward from the center region and may decrease in dimension, or change shape/dimension entirely to suit the geometry of the obtained image. An example of image division into multiple work regions is shown in FIG. 4.

In block 908, the processor may calculate a cancellation likelihood for each of the identified work regions. The cancellation likelihood may be calculated based on one or more of a distance from the center of the first image, distance from the center of the boundary shape when overlaid on the first image, or a projected direction of motion of the image capture device. The cancellation likelihood may be an approximate value and need not represent a precise calculation of the chance of retention or discard.

In implementations including virtual reality applications, the cancellation likelihood may be based on a duration assigned to each work region. The duration may represent a time during which the virtual reality field of view is not expect to overlap with the work region. If the duration time is high, then the cancellation likelihood may be high because the virtual reality viewport is unlikely to overlap with the region before expiration of the duration period.

In block 910, the processor may assign a trimming weight to each of the identified work regions based on the calculated cancellation likelihood. The trimming weight may be an alphanumeric representation of the work region's likelihood to be discarded or retained. For example, the letters A-Z may be used to indicate an order of priority. Similarly, numerical rankings may be assigned to the work regions. Thus, the trimming weights may be generated to indicate both a likelihood of discard or retention, as well as the execution priority of the associated work region.

In block 912, the processor may add or otherwise insert the work regions into an execution work list as work items. The order of work items within the execution work list may be based on the trimming weights assigned to each work region. Work items having a higher priority (i.e., those least likely to be discarded, cancelled, or trimmed) may be positioned first within the execution work list. In some implementations, the execution work list may service multiple processors, or may service a single processor. In multi-processor implementations, each processor may have a separate execution work list associated therewith.

In block 914, the processor may obtain a second image or an additional image (e.g., third, fourth, fifth image, etc.). The second image may be obtained in a manner similar to that discussed with reference to block 902.

In block 916, the processor may update the working boundary shape.

That is, the processor may determine whether the working boundary shape fits both the first image and the second image. If the second image is not precisely axially aligned with the first image, an offset may exist between the image frames. The dimensions of the working boundary box may then be modified such that no empty space lies within the perimeter of the boundary shape. This modified boundary shape may be referred to as the updated working boundary shape. Each time a new image is obtained, the updated working boundary shape may be updated again. Thus, the updated working boundary shape may overlap the common shared regions of all obtained images at any given time. Any portions of an image lying outside the update working boundary shape may be classified as discard regions.

In block 918, the processor may overlay the updated working boundary shape on the second image and may classify regions lying outside the updated working boundary shape as belonging to the discard regions. Thus, the size of the discard region may increase or decrease as new images are obtained.

In block 920, the processor may determine whether any active work items within the execution work list are associated with work regions that overlap discard regions. For each new image that is obtained, the discard regions may be compared against work items in order to delay or remove from processing any work items that overlap a region that is now classified as a discard region. The processor may accomplish this determination by a simple comparison of the work regions to the discard regions. In block 922, the processor may cancel any work items that overlap the discard region.

The processor may again identify work regions in block 906, calculate cancellation likelihoods for each work region in block 908, and assign trimming weights to each work region in block 910.

In block 912, the processor may add the work regions to the execution work list based on both the trimming weights of the first image and the second image. Thus, the work items of the second image may be interspersed into the execution work list and may share priority, have lesser priority, or have higher priority than work items of the first image. The obtaining and prioritization of geometric based work items may continue until all images are obtained and all work items are scheduled. Identifying work regions for the second and subsequent images may include identifying new work regions based on the current updated working boundary shape, and/or changing the boundaries of existing work regions to conform to some of the boundaries of the updated working boundary shape.

Figure 10:
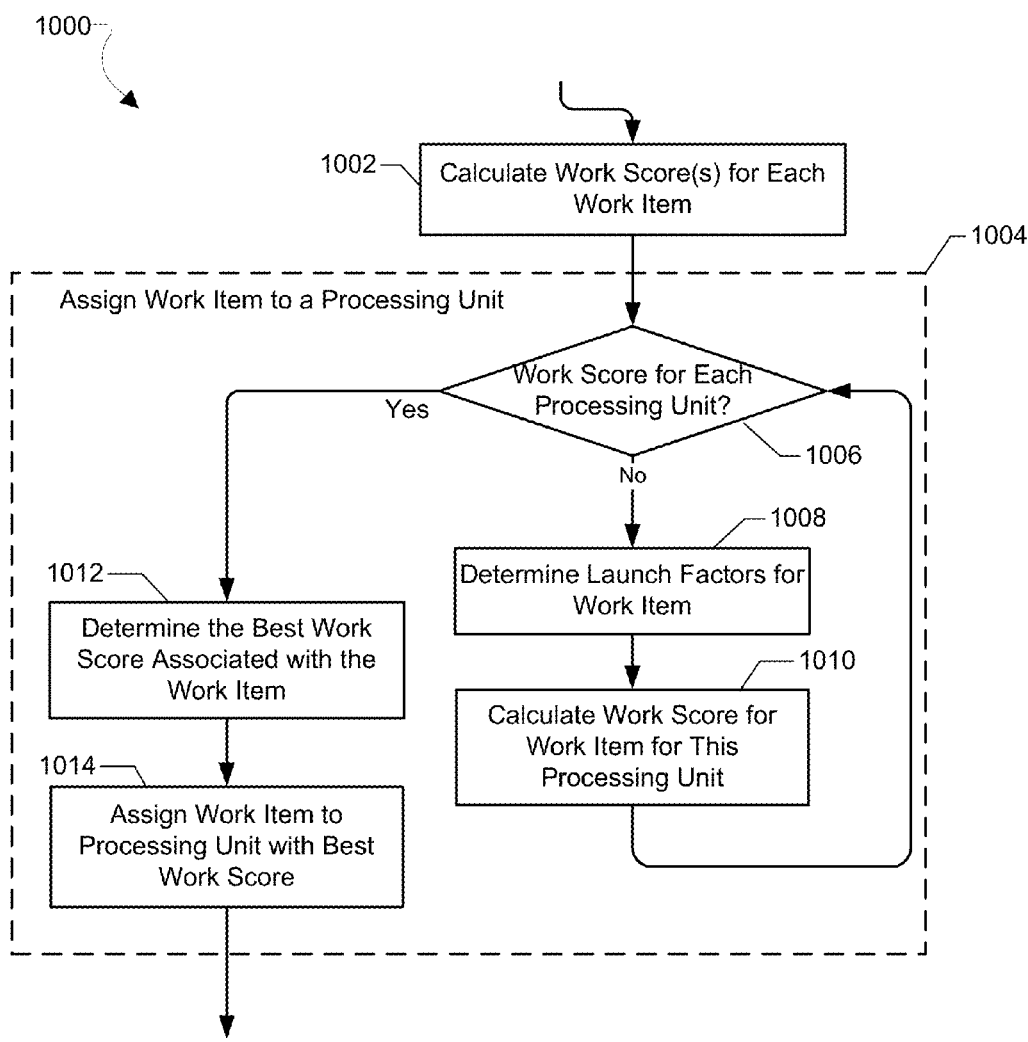
FIG. 10 is a process flow diagram illustrating a method for execution of work prioritized based on work regions across multiple processing units according to various embodiments.

FIG. 10 illustrates a process flow diagram of a method 1000 for execution of work prioritized based on work regions across multiple processing units in various embodiments and implementations. The method 1000 may be implemented on a computing device (e.g., 100) and carried out by a processor (e.g., 110) in communication with the communications subsystem (e.g., 130) and the memory (e.g., 125).

In block 1002, the computing device may calculate a work score for reach work item. The work score may be specific to each available processing unit such that each work item has multiple work scores, indicating the suitability of that work item for processing on each of the available processing units. The work score may be calculated using one or more of several launch factors including, for example, the size and/or shape of the work region associated with the work item, battery life required to complete processing of the work item, and the trimming weight of the work item. For example, work items associated with large and/or rectangular work regions may be well suited for processing on a graphical processing unit (GPU), which may be well adapted for processing of sizable, predictably shaped image regions. However, the GPU may be an inefficient processor of irregularly shaped work regions, or numerous small work items. Similarly, the central processing unit (CPU) may be best suited to processing of work items having a trimming weight that indicates a high likelihood of cancellation, because it may be easier to cancel work items that have begun executing on the CPU than it may be for a digital signal processor (DSP) or the GPU.

In block 1004, the processor may assign the work item to a processing unit based on the work score of the work item. The operations in block 1004 may include several operations that may be implemented to determine the processing unit to which a work item should be assigned.

In block 1006, the processor may determine whether the work item has a calculated work score for each available processing unit (e.g., 110).

In response to determining that the work item does not have a work score for each available processing unit (i.e., block 1006="No"), the processor may determine, calculate, or lookup the launch factors for the work item in block 1008. In block 1010, the processor may calculate a work score for the work item as it relates to the specific processor for which a work score is missing. The processor may again determine whether the work item has a work score for each processing unit in determination block 1006. In various implementations, the launch factors may include the launch overhead (e.g., the processing resources required to launch the work item) for the work item on a specific processor type, the battery exhaustion and/or thermal response associated with processing the work on a specific processor, the ease of cancelling work from a specific processor or processor type queue, and utilization of the processor based on the "shape" of the work item.

In response to determining that there is a work score associated with the work item for each available processing unit (i.e., block 1006="Yes"), the processor may determine the best work score associated with the work item in block 1012. This may be the highest score, the lowest score, or the score closest to zero. The processor may determine the best work score by simple mathematical comparison of the work scores associated with a work item.

In block 1014, the processor may assign the work item to the iteration space or execution queue of the processing unit to which the work item is best suited (i.e., having the best work score). The processor (e.g., 110) may continue assigning work items to different processing units until all work is completed and the final image is produced.

In various implementations, the calculation of processor specific work scores may be based upon one or more of the launch overhead (e.g., the processing resources required to launch the work item) for the work item on a specific processor type, the battery exhaustion and/or thermal response associated with processing the work on a specific processor, the ease of cancelling work from a specific processor or processor type queue, and utilization of the processor based on the "shape" of the work item.

In implementations including virtual reality and gaming applications, the real-time generation of image frames subject to physical motion requires substantial processing resources. The inability to generate image frames fast enough can lead to a visual lag or, jitter. Such visual effects often make virtual reality users nauseous, or cause eye weariness and discomfort. In various types of gaming and virtual reality applications, there may be a large number of world objects and in-game actions including objects (e.g., collision, shatter, smoke-fire effects). Some of these actions and objects may not be visible to the interactive user. By enabling the efficient processing of only those objects and actions that are likely to become visible to the user, the various embodiments and implementations may reduce lag and jitter effects, and thus improve the overall user experience for gaming and virtual reality users. The various implementations may be particularly well-suited for addressing shatter visuals and in-view collisions, in which not all of the world objects must be processed in order to obtain a final "new" visual. In various implementations, all the world (i.e., in-game, or in-view) objects may be considered to be occupied a 2-D or 3-D image representing the game world. Thus, the various embodiments and implementations enable work processing to be limited to regions of the image that are likely to be viewed by the user within a time-frame. Objects and actions may time-out (i.e., become irrelevant) if not viewed within a duration of time. The time-out duration may be pre-determined based on the nature of the object and actions. Processing of objects and actions that lie within regions of the image likely to be seen by the user before the corresponding time-outs may be prioritized by the one or more processors of the computing device. Conversely, processing of other objects and actions (i.e., those unlikely to be viewed during the tie frame) may be deferred or skipped entirely.

In a virtual reality application new objects may appear periodically within the user's field of view, and new actions may start (e.g., shatter, bounce after collision between two objects, burning after collision, etc.). At such times, the processor may make a new determination as to which of the regions are of interest so as to limit processing of objects and actions falling within the determined regions of interest.

Figure 11:
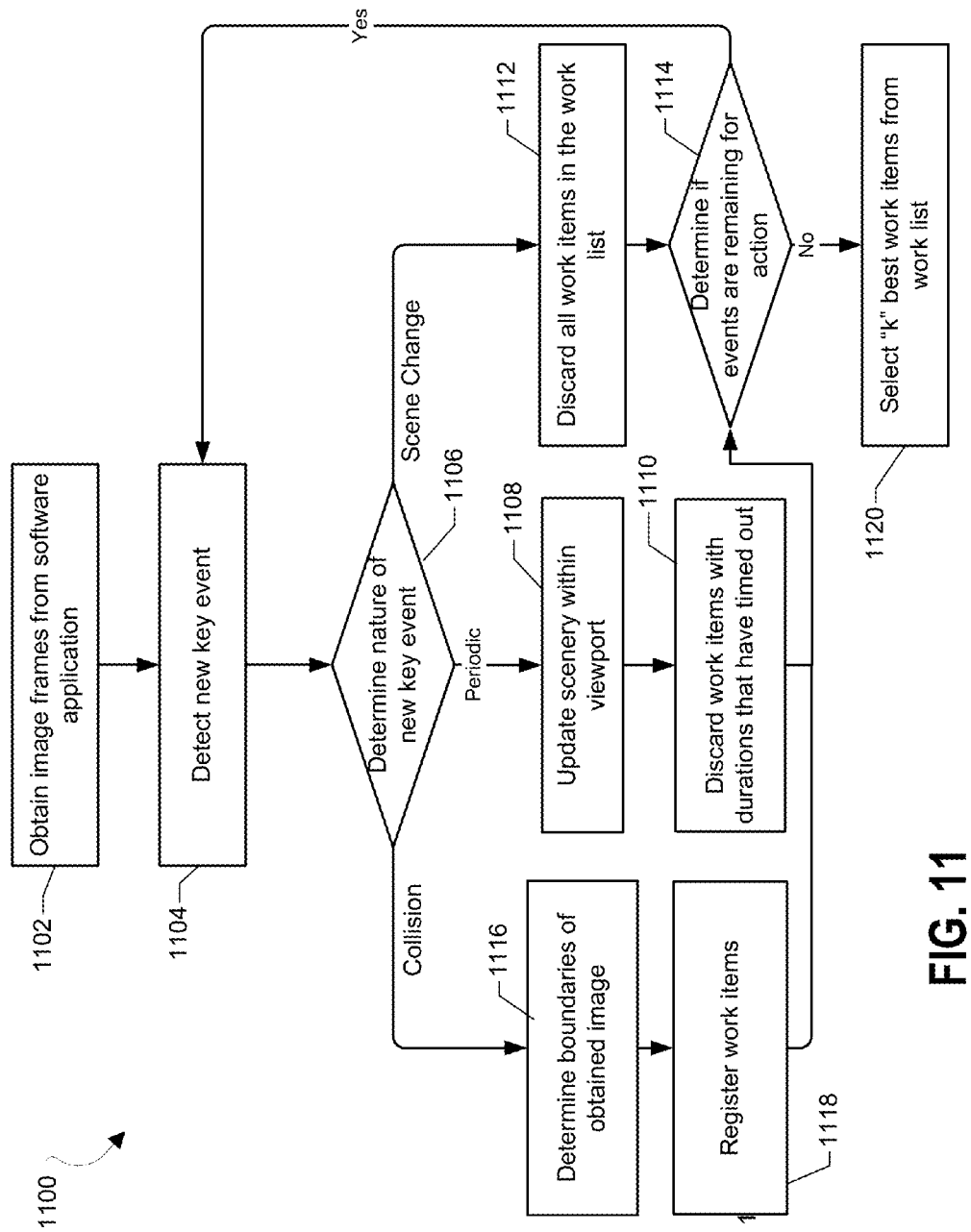
FIG. 11 is a process flow diagram illustrating a general method for implementing geometric work scheduling in a virtual reality environment.

FIG. 11 illustrates a process flow diagram of a method 1100 for geometrically based prioritization of work processing in a virtual reality gaming application. The method 1100 may be implemented on a computing device (e.g., 100) and carried out by a processor (e.g., 110) in communication with the communications subsystem (e.g., 130), and the memory (e.g., 125).

In block 1102, the computing device may obtain an image frame from the application. The processor (e.g., 110) may calculate an expected direction of movement and expected position of the user's viewport using any standard motion prediction technique, such as the use of one or more Kalman filtering techniques. The direction of motion may be used to calculate a predicted duration of time during which the viewport (i.e., virtual reality field of view) will not access a particular region. This duration "t" may be assigned to the obtained image, thus the coordinate representation for the images may be (x, y, t).

In block 1104, the computing device may detect a new key event. The processor (e.g., 110) may determine the nature of the event in block 1106. Events may include, for example, on-screen collisions, periodic position updates, and scene changes. Key events in graphics processing implementations (e.g., virtual reality view space applications) may be those events that result in reconfiguration or rearranging of the viewport, such as collisions, shatter, scene changes, and other substantial changes to the visual field.

If the event is a collision, the processor (e.g., 110) may, in block 1116, determine the boundaries of the obtained image, determine a shatter pattern (e.g., work region), and determine the trimming weights for each work shape or region in accordance with methods 200 and 900.

In block 1118, the processor (e.g., 110) may register work items associated with the work shapes or regions to a work list for processing. Work items whose duration "t" times out prior to processing of the work item may be removed from the work list and any associated processor queues. The computing device may then perform the operations in block 1114 as described below.

If the event is a periodic position update, in block 1108, the computing device may perform periodic updates to scenery within the viewport. In accordance with methods 200 and 900, the processor (e.g., 110) may update the working boundary shape or region, and may recalculate the "t" for each active region (i.e., those regions for which "t" has not expired). The revaluation of "t" may result in the modification of trimming weights for various work regions. In some cases, the reevaluation of duration "t" may result in the discarding of work items.

In block 1110, the computing device may discard work items whose duration has timed out. Further, the processor (e.g., 110) of the computing device (e.g., 100) may reset the temporal component of the working boundary shape or region upon duration time out. The computing device may then perform the operations in block 1114 as described below.

If the detected event is a scene change, in which the entire field of view changes, in block 1112 the computing device may discard all work items in the work list and reset the default boundary shape or region. Because the previously queued image segments (e.g., work items) are no longer applicable to the current scene, there may be no need for processing of the associated work items. Therefore, the processor (e.g., 110) may discard all work items regardless of their trimming weights.

In block 1114, the computing device may determine whether there are any events remaining for action. If events are present (i.e., block 1114="Yes"), the processor (e.g., 110) may again determine the nature of the remaining event in block 1106.

If there are no events remaining (i.e., block 1114="No"), the computing device may select "K" best work items from the work list and may process those work items via one or more processors in block 1120. The processor may continue obtaining images and calculating predicted motion until all images are processed or the application exits.

In various embodiments, software applications may use different strategies for constructing the discard regions (i.e., a geometrically shaped region within which all work-items may be discarded) and the boundary regions (i.e., geometrically shaped regions within which all work-items may be assigned a new trim weight based on an updated likelihood for discard). The ability to employ application-specific bounding strategies may enable software applications of diverse types and uses to take advantage of the various implementations and embodiments for geometric scheduling of work items.

The discard regions and boundary regions may be recomputed when the software application encounters "key events" such as the arrival of a new "key image frame" in a panorama image-processing software application. Evaluation of the work required to process the key image frame may result in the working boundary box shape experiencing a change in shape or size (shrunk). A geometrically shaped region between the prior working boundary shape and the updated working boundary shape may become the discard region during evaluation by such a panorama processing software application.

In various implementations and embodiments, the location of the discard region with respect to the updated working boundary shape may indicate that regions within the updated working boundary shape that are closest to the discard region have become more likely to be discarded on the arrival of a subsequent key event. Conversely, those geometrically-bounded regions lying within the working boundary shape and positioned furthest from the discard region(s) may be less likely to be discarded on the arrival of a subsequent key event. In such implementations, the trim weights of all geometrically-bounded regions may be updated according to the bounding scheme employed by the respective software application.

Various implementations may include geometric work scheduling for broad categories of software applications, such as computer games, virtual reality, augmented reality, mixed reality, computer vision, real-time camera image-processing, etc.

In some implementations, a working boundary shape may be employed. Software applications may maintain a working boundary shape that may be initialized to an excessively large shape and may continue to shrink as a result of the processing of new key events. The geometrically-bounded regions that are moved from the interior of the working boundary shape to the exterior of the working boundary shape during key event updates become discard regions.

The proximity of the discard region may determine the shape/location of likelihood-update regions within the updated working boundary shape. That is, those geometrically-bounded regions that lie within the working boundary shape, but are positioned close to the perimeter/exterior of the working boundary shape, may be considered to be "likely to be updated" because their position makes it likely that their trim weights will require updating (or they may be moved to discard regions) upon processing of a new key event. Additional software application-specific functionalities to predict subsequent key event properties (e.g., using motion-prediction techniques to predict the location and shape properties) may further aid the determination of likelihood-update regions.

In various implementations, pre-determined region bounds may be employed. A software application may a-priori divide a large geometric space into a number of regions. Each pre-determined region, or a collection of geometrically adjacent pre-determined regions, may become a discard region or a likelihood-update region. For example, a virtual reality gaming software application may pre-divide the entire head-set view-space into equally sized pre-determined regions. The software application may use head-tracking motion prediction (e.g., Kalman Filters) to discard one or more pre-determined regions as unlikely to be viewed by the head-set within the next "T" milliseconds. The software application may decide to discard all work-items whose results the user will almost certainly not see, and may update pre-determined regions closer to the current view position of the head-set as more or less likely to be viewed in the next T milliseconds. The trim weights of the likelihood-update regions may be adjusted accordingly.

In various implementations, the boundary scheme may employ a focus regions strategy. The attention of a user interacting with a software application may be focused for a time on a limited part of a large geometric space, such as the head-set view within the full 360 degree view space in a virtual reality application, or the screen-space view within the larger world view space in a traditional computer game. The point of focus may be defined by the function of the software application, or due to physical limitations, such as how fast a user can move the virtual reality head-set. The discard region and likelihood-update regions may be determined based on their respective proximity to the current focus region, as well as predictions of the likelihood that the user focus will enter a larger region beyond/surrounding the current focus region within a given timeframe. The shape and size of the discard region and likelihood-update region may be determined dynamically after each key event, in contrast with the pre-determined strategy.

Complex software applications may employ a hybrid of strategies to cohesively implement geometric scheduling over multiple features and functions. The geometric scheduling space may consist of not just physical view spaces but other dimensions, such as time, and application-specific dimensions, such as the health of a game character. The discard and likelihood-update regions may be chosen to span a subset or all of the dimensions based on the nature of the application and the feature subject to geometric scheduling.

Figure 12:
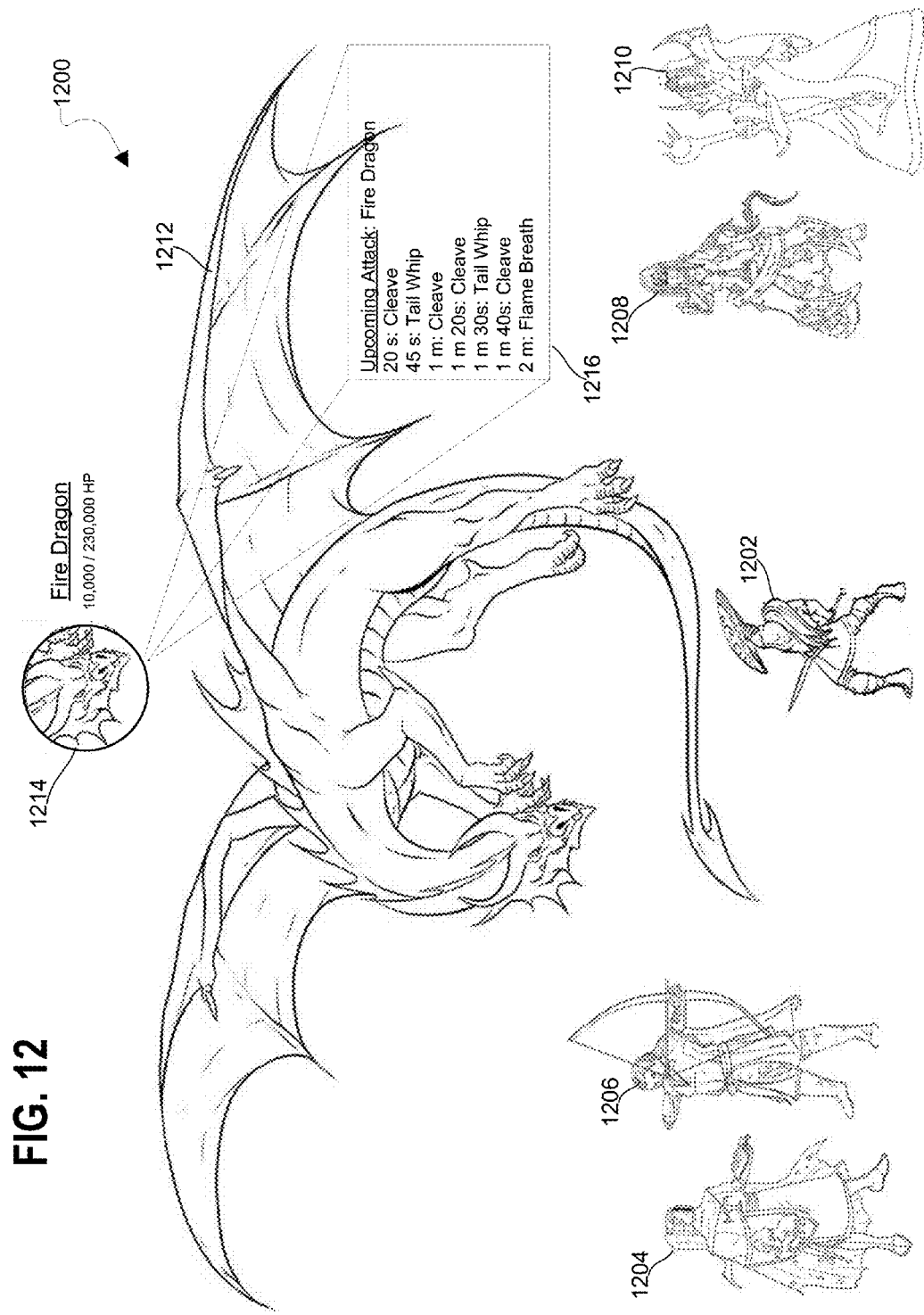
FIG. 12 is a diagram illustrating an implementation of geometric work scheduling in a computer game according to some embodiments.

FIG. 12 illustrates a diagram of a computer game screenshot 1200 for a computer game implementing geometrically based prioritization of work processing. The computer game depicted in screenshot 1200 may employ some or all of methods 200, 1000, and 1100 and may be implemented on a computing device (e.g., 100) and carried out by a processor (e.g., 110) in communication with the communications subsystem (e.g., 130), and the memory (e.g., 125).

In various implementations, a computer game may employ multiple embodiments of geometric scheduling of work items. As discussed with reference to FIGS. 9 and 11, geometric scheduling may be used to handle graphics/image processing in a manner that may improve processing speed and efficiency. In the illustrated screenshot 1200, multiple player characters 1202-1210 may be engaged in a game fight with a dragon 1212 non-player enemy.

One or more processors (e.g., processor 110, multiple processor, and/or a GPU) may render the battle scene and update the image of character 1202-1210 and dragon 1212 movement as user inputs are received and the battle progresses. The specific screenshot displayed to any one of the player characters 1202-1210 at a given point in time depends upon his/her vantage point with respect to the dragon 1212 and environmental surroundings. Different classes of player character 1202-1210 may be more likely to be close to the dragon 1212, and may be more or less likely to move than other classes of player character 1202-1210. For example, in the illustrated screenshot 1200, the warrior player character 1202 may, as will be known to the software application, be likely to stand in close proximity to the dragon 1212, but may be likely to move around in order to better position the dragon 1212 away from "range" player characters 1206-1210. Thus, the computer game software application may determine that portions of the surrounding environment lying far away from the dragon are likely to be discarded. That is, the dragon 1212 may be the focus region of the warrior player character 1202 view, and regions lying further from the dragon 1212 focus region are increasing likely to be discarded as distance from the dragon 1212 increases. However, because warrior player character 1202 is highly mobile within close proximity to the dragon 1212, the trim weight (i.e., likelihood of cancellation) of regions within the focus region, even those near the exterior, may be low.

Conversely, the range player characters 1206-1210 may maintain a long distance from the dragon 1212, but may not move around very often. Such player characters 1206-1210 may have large focus regions (e.g., a more panoramic view), and thus may have small discard regions. However, because these characters are relatively immobile, the likelihood that regions near the exterior of their field of view will be discarded may be high (e.g., high trim weights). At the same time, the armored cleric player character 1204 may be highly mobile, and may generally stand at a distance, making it difficult for the software application to perform much discarding of regions within his/her field of view.

In another example of geometric scheduling of work items, the computer game may monitor the artificial intelligence engine of the dragon 1212 to determine the work that should be queued and the work that is likely to be discarded. As illustrated in the screenshot 1200, an enemy status indicator 1214 may provide information about the remaining health point (HP) of the dragon 1212, in this case 10,000 of 230,000 points remain. Each attack of the player characters 1202-1210 may subtract points from the remaining balance.

An action queue 1216 for the dragon 1212 depicts upcoming attacks to be performed by the dragon (i.e., functions to be carried out by the computer game software application). In the illustrated example, functions such as "cleave" and "tail whip" occur at regular intervals of 20 seconds and 45 seconds respectively, implying that these are standard, low processing cost functions. However, the "flame breath" function is not scheduled to occur for another 2 minutes, implying that it might be a more devastating attack to the player characters 1202-1210, and thus may require greater image and AI processing.

For example, processing of the "flame breath" attack may include processing of visual representation of flames, full body movement of the dragon, responsive movement of player characters receiving the attack, as well as the updating of player character 1202-1210 metrics and dragon 1212 metrics. However, the loading and pre-processing of these work items in preparation for "flame breath" execution is unnecessary and wasteful if the dragon 1212 dies within the next 2 minutes.

To reduce unnecessary queuing and pre-processing of work items, the computer game software application may monitor the dragon's 1212 HP and a damage-per-second (DPS) rate of the value of attacks on the dragon 1212 produced by the player characters 1202-1210 per second on average. The computing device may then calculate a moving target of "battle time remaining" (e.g., time until the dragon is incapacitated). The computer game software application may compare this predicted time frame to the AI work queue and may determine that functions lying closer to the expiration of the time frame or outside the time frame are less likely to occur. The likelihood that functions (e.g., dragon attacks) will be discarded may change as time goes on and the HP or DPS rates change. The computing device may use this information to organize work items within processor work lists, and thus may avoid queuing the "flame breath" attack if there is a high likelihood that the predicted "remaining battle time" is shorter than the 2 minute time frame.

Such implementations of geometric work scheduling may be applied to all non-player characters, actions, API calls, and even automated player character 1202-1210 actions. Implementations of geometric work scheduling may reduce in-game "lag" (i.e., slow frame updating or jittery transitions), and may enhance responsiveness to player input, thus improving overall user experience.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a subscription and data receiving associated with a different subscription, such identifiers are merely for convenience and are not meant to limit various embodiments to a particular order, sequence, type of network or carrier.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, (e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for geometry based work execution prioritization on a computing device, comprising:
    obtaining, by a processor of the computing device, a first image;
    overlaying, by the processor, a default boundary shape on the first image to initialize a working boundary shape and identify a discard region lying outside the working boundary shape;
    identifying, by the processor, work regions lying within the working boundary shape;
    determining, by the processor, a cancellation likelihood for each of the identified work regions;
    determining, by the processor, a trimming weight for each of the identified work regions using the cancellation likelihoods;

adding, by the processor, work items associated with each of the identified work regions to an execution work list in an order based, at least in part, on the determined trimming weights;

determining, by the processor, a work score for each work item in the execution work list based, at least in part on at least one of the determined trimming weight of the work region associated with the work item, a size of the work item, a shape of the work item, or a commonality of processing elements with other work items; and determining, by the processor, a work item to execute on a second processor based on the work score for the determined work item.

2. The method of claim 1, further comprising:

obtaining, by the processor, a second image;

updating, by the processor in response to obtaining the second image, a position of the working boundary shape;

overlaying, by the processor, the updated working boundary shape on the second image to identify updates to the discard region lying outside the updated working boundary shape;

determining, by the processor, whether any work items are associated with work regions that overlap the discard region;

cancelling, by the processor, a work item in response to determining that the work item overlaps the discard region;

updating, by the processor, the work regions lying within the updated working boundary shape;

determining, by the processor, a cancellation likelihood for each of the updated work regions;

determining, by the processor, a trimming weight to each of the identified work regions based, at least in part, on the cancellation likelihoods; and adding, by the processor, work items associated with each of the identified work regions to the execution work list in an order based, at least in part, on the determined trimming weights.

3. The method of claim 2, wherein determining the cancellation likelihood for each of the updated work regions comprises:

determining, by the processor, a direction in which a focus of the obtained images is moving; and determining, by the processor, the cancellation likelihood based, at least in part, on the determined direction of motion.

4. The method of claim 2, further comprising:

generating, by the processor, a composite image from portions of each obtained image that lie within a final updated working boundary shape.

5. The method of claim 4, wherein the composite image is a panorama.

6. The method of claim 4, wherein the composite image is a virtual reality rendering.

7. The method of claim 1, further comprising:

redetermining, by the processor, the cancellation likelihood of each of the work regions based, at least in part, on a comparison of a position of an overlay of the updated working boundary shape on the first image to the position of the overlay of the working boundary shape;

determining, by the processor, updated trimming weights for the work regions based, at least in part, on the cancellation likelihoods; and adjusting, by the processor, an order of the work items in the execution work list based, at least in part, on the updated trimming weights determined for the work items in the execution work list.

8. The method of claim 1, further comprising determining, by the processor, a work score for each work item in the execution work list, for every processor of the computing device, such that each work item has multiple work scores indicating processing suitability with regard to each processing unit.

9. The method of claim 1, wherein determining a work score for each work item, in the execution work list is further based, at least in part, on at least one member selected from the group consisting of a launch overhead for the work item; a battery exhaustion associated with processing the work item, ease of cancelling the work item, and utilization of the processor.

10. The method of claim 1, wherein the cancellation likelihood is based, at least in part, on a distance of a work region from a center of an image.

11. The method of claim 1, wherein determining the cancellation likelihood for each of the identified work regions comprises:

determining, by the processor, a timeout duration; and determining, by the processor, a likelihood that a subsequent image will not lie within a work region for a period exceeding the timeout duration.

12. The method of claim 11, wherein determining, by the processor, the likelihood that a subsequent image will not lie within the work region for a period exceeding the timeout duration comprises executing one or more Kalman filters, to predict a position of the subsequent image.

13. The method of claim 1, wherein there are multiple working boundary shapes.

14. The method of claim 1, wherein the first image is a viewport of a virtual reality view space.

15. The method of claim 2, wherein updating the work regions lying within the updated working boundary shape comprises:

identifying, by the processor, one or more new work regions lying within the updated working boundary shape; and changing, by the processor, boundaries of the work regions to fit within the updated working boundary shape.

16. A computing device configured for geometry based work execution prioritization, comprising:

one or more processors configured to:

obtain a first image;

overlay a default boundary shape on the first image to initialize a working boundary shape and identify a discard region lying outside the working boundary shape;

identify work regions lying within the working boundary shape;

determine a cancellation likelihood for each of the identified work regions;

determine a trimming weight for each of the identified work regions using the cancellation likelihoods;

add work items associated with each of the identified work regions to an execution work list in an order , at least in part, on the determined trimming weights;

determine a work score for each work item in the execution work list based, at least in part on at least one of the determined trimming weight of the work region associated with the work item, a size of the work item, a shape of the work item, and commonality of processing elements with other work items; and determine a work item to execute on a second processor based, at least in part, on the determined work score for the determined work item.

17. The computing device of claim 16, wherein the one or more processors are further configured to:
obtain a second image;
updating, by the processor, a position of the working boundary shape update a position of the working boundary shape in response to obtaining the second image;
overlay the updated working boundary shape on the second image to identify updates to the discard region lying outside the updated working boundary shape;
determine whether any work items are associated with work regions that overlap the discard region;
cancel a work item in response to determining that the work item overlaps the discard region;
update the work regions lying within the updated working boundary shape;
determine a cancellation likelihood for each of the updated work regions;
determine a trimming weight for each of the identified work regions based, at least in part, on the cancellation likelihoods; and
add work items associated with each of the identified work regions to the execution work list in an order based, at least in part, on the determined trimming weights.

18. The computing device of claim 17, wherein the one or more processors are further configured to determine the cancellation likelihood for each of the updated work regions by:
determining a direction in which a focus of the obtained images is moving; and
determining the cancellation likelihood based, at least in part, on the determined direction of motion.

19. The computing device of claim 17, wherein the one or more processors are further configured to:
generate a composite image from portions of each obtained image that lie within a final updated working boundary shape.

20. The computing device of claim 16, wherein the one or more processors are further configured to:
redetermine the cancellation likelihood of each of the work regions based, at least in part, on a comparison of a position of an overlay of the updated working boundary shape on the first image to the position of the overlay of the working boundary shape;
determine updated trimming weights for the work regions based, at least in part, on the redetermined cancellation likelihoods; and
adjust an order of the work items in the execution work list based, at least in part, on the updated trimming weights determined for the work items in the execution work list.

21. The computing device of claim 16, wherein the one or more processors are further configured to determine a work score for each work item in the execution work list, for every processor of the computing device, such that each work item has multiple work scores indicating processing suitability with regard to each processing unit.

22. The computing device of claim 16, wherein the one or more processors are further configured to determine the cancellation likelihood for each of the identified work regions by:

determining a timeout duration; and
determining a likelihood that a subsequent image will not lie within a work region for a period exceeding the timeout duration.

23. The computing device of claim 17, wherein the one or more processors are further configured to update the work regions lying within the updated working boundary shape by:
identifying one or more new work regions lying within the updated working boundary shape; and
changing boundaries of the work regions to fit within the updated working boundary shape.

24. A computing device configured for geometry based work execution prioritization on a comprising:
means for obtaining a first image;
means for overlay a default boundary shape on the first image to initialize a working boundary shape and identify a discard region lying outside the working boundary shape;
means for identifying work regions lying within the working boundary shape;
means for determining a cancellation likelihood for each of the identified work regions;
means for determining a trimming weight for each of the identified work regions using the cancellation likelihoods;
means for adding work items associated with each of the identified work regions to an execution work list in an order based, at least in part, on the determined trimming weights;
means for determining, by the processor, a work score for each work item in the execution work list based, at least in part on at least one of the determined trimming weight of the work region associated with the work item, a size of the work item, a shape of the work item, and commonality of processing elements with other work items; and
means for determining, by the processor, a work item to execute on a second processor based on the work score for the determined work item.

25. A non-transitory processor readable medium having stored thereon processor executable instructions causing a processor to perform operations for geometry based work execution prioritization, comprising:
obtaining a first image;
overlaying a default boundary shape on the first image to initialize a working boundary shape and identify a discard region lying outside the working boundary shape;
identifying work regions lying within the working boundary shape;
determining a cancellation likelihood for each of the identified work regions;
determining a trimming weight to each of the identified work regions using the cancellation likelihoods;
adding work items associated with each of the identified work regions to an execution work list in an order based, at least in part, on the determined trimming weights
determining, by the processor, a work score for each work item in the execution work list based, at least in part on at least one of the determined trimming weight of the work region associated with the work item, a size of the work item, a shape of the work item, and commonality of processing elements with other work items; and determining, by the processor, a work item to execute on a second processor based on the work score for the determined work item.

26. The non-transitory processor readable medium of claim 25, having stored thereon processor executable instructions causing the processor to perform operations further comprising:

obtaining a second image;

updating a position of the working boundary shape in response to obtaining the second image;

overlaying the updated working boundary shape on the second image to identify updates to the discard region lying outside the updated working boundary shape;

determining whether any work items are associated with work regions that overlap the discard region;

cancelling a work item in response to determining that the work item overlaps the discard region;

updating the work regions lying within the updated working boundary shape;

determining a cancellation likelihood for each of the updated work regions;

determining a trimming weight to each for the identified work regions based, at least in part, on the cancellation likelihoods; and adding work items associated with each of the identified work regions to the execution work list in an order based, at least in part, on the determined trimming weights.

* * * * *